US012124209B2

(12) United States Patent
Sato et al.

(10) Patent No.: US 12,124,209 B2
(45) Date of Patent: Oct. 22, 2024

(54) IMAGE FORMING APPARATUS

(71) Applicant: BROTHER KOGYO KABUSHIKI KAISHA, Nagoya (JP)

(72) Inventors: Shougo Sato, Seto (JP); Kazuna Taguchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/366,963

(22) Filed: Aug. 8, 2023

(65) Prior Publication Data

US 2024/0053704 A1 Feb. 15, 2024

(30) Foreign Application Priority Data

Aug. 12, 2022 (JP) ................................ 2022-129130

(51) Int. Cl.

| | |
|---|---|
| ***G03G 21/16*** | (2006.01) |
| ***G03G 15/04*** | (2006.01) |
| ***G03G 15/08*** | (2006.01) |
| ***G03G 21/00*** | (2006.01) |
| ***G03G 21/12*** | (2006.01) |
| ***G03G 21/18*** | (2006.01) |

(52) U.S. Cl.

CPC ... *G03G 21/1814* (2013.01); *G03G 15/04054* (2013.01); *G03G 15/0875* (2013.01); *G03G 21/007* (2013.01); *G03G 21/12* (2013.01); *G03G 21/1842* (2013.01); *G03G 21/1857* (2013.01); *G03G 2215/0409* (2013.01); *G03G 2215/0692* (2013.01); *G03G 2221/1654* (2013.01); *G03G 2221/1657* (2013.01)

(58) Field of Classification Search

CPC . G03G 15/043; G03G 15/04045; G03G 21/16
USPC .......................................................... 399/111
See application file for complete search history.

(56) References Cited

U.S. PATENT DOCUMENTS 11,733,639 B2 * 8/2023 Sato .................... G03G 21/105 399/359

FOREIGN PATENT DOCUMENTS

| | | | |
|---|---|---|---|
| JP | 2017-044727 A | | 3/2017 |
| JP | 2017-054085 A | | 3/2017 |
| JP | 2019045720 | * | 3/2019 |

* cited by examiner

*Primary Examiner* — Hoan H Tran
(74) *Attorney, Agent, or Firm* — Merchant & Gould P.C.

(57) ABSTRACT

An image forming apparatus includes a main body housing and a process cartridge demountable from the main-body housing. The process cartridge includes a drum cartridge and a toner cartridge. The drum cartridge includes a photosensitive drum, a drum cleaner, an outlet with an outlet opening, an outlet shutter, and a lever. The lever is pivotable between a first position at which the lever places the outlet shutter closing the outlet opening and a second position at which the lever places the outlet shutter opening the outlet opening. When the lever is located at the first position, the process cartridge is demountable from the main-body housing. When the lever is located at the second position, the process cartridge is disabled to be demounted from the main-body housing.

21 Claims, 14 Drawing Sheets

1

IMAGE FORMING APPARATUS

REFERENCE TO RELATED APPLICATIONS

This application claims priority from Japanese Patent Application No. 2022-129130 filed on Aug. 12, 2022. The entire content of the priority application is incorporated herein by reference.

BACKGROUND ART

An image forming apparatus having a plurality of image forming units, a collected-toner conveyer, a plurality of shutters, and a shutter open-close assembly, is known. The toners may be collected from the image forming units through outlet openings, and the collected toners may be conveyed by the collected-toner conveyer. The outlet openings may be opened or closed by the shutters, and the shutter open/close assembly may open or close the plurality of shutters simultaneously.

DESCRIPTION

When an image forming unit is to be replaced, the shutter open/close assembly may open not only the shutter of the image forming unit to be replaced, but also the other shutters of the image forming units not to be replaced, unnecessarily.

When the shutters of the image forming units that may not necessarily be replaced are opened or closed, the toners may scatter around the shutters, and areas around the image forming units may be dirtied with the scattered toners.

Aspects of the present disclosure provide an image forming apparatus including a plurality of process cartridges, reducing the likelihood that, when one of the process cartridges is replaced, areas around outlet shutters of the remaining process cartridges not to be replaced may be dirtied with toners scattering around outlet shutters.

1. OVERALL CONFIGURATION OF IMAGE FORMING APPARATUS

Figure 1:
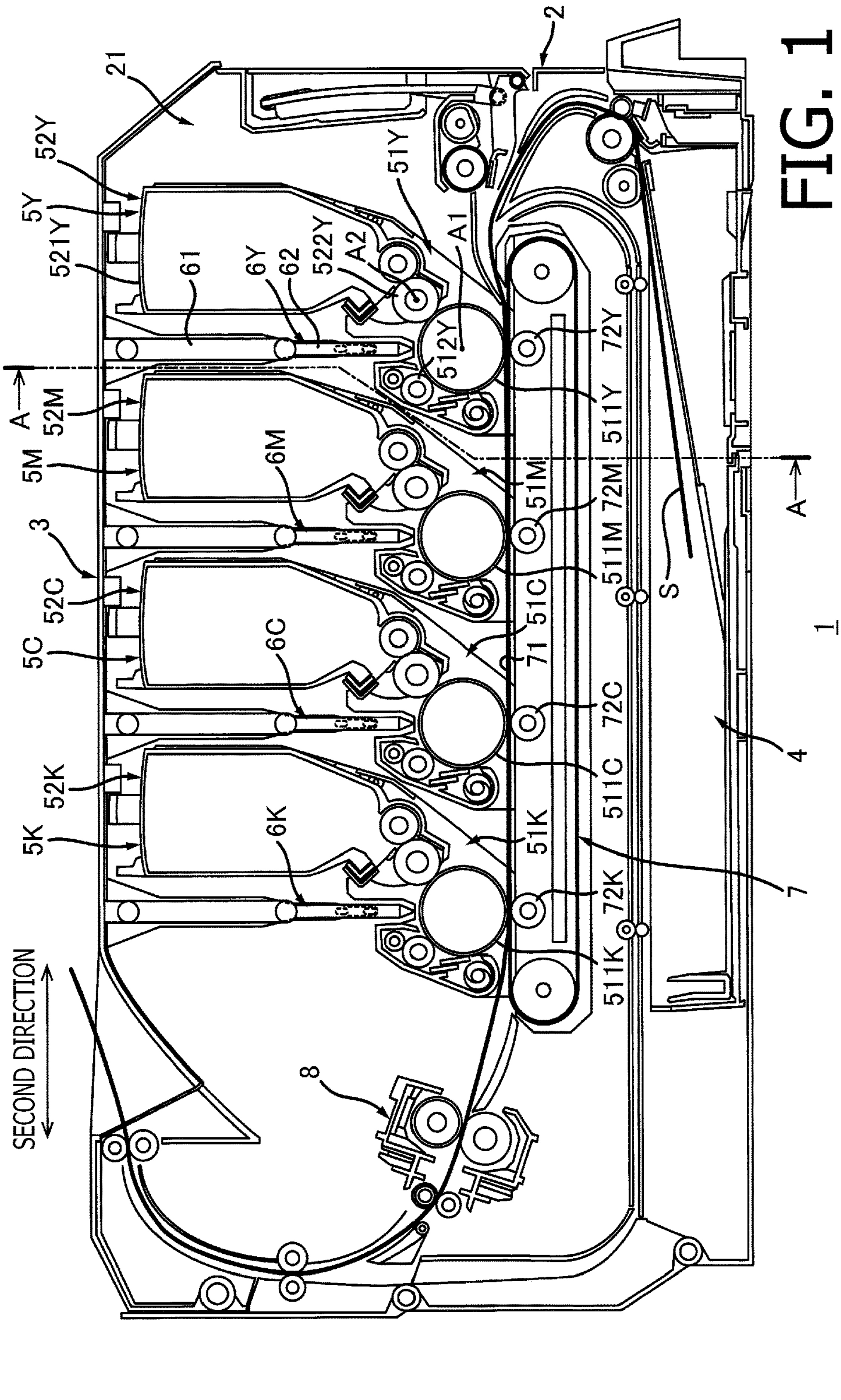
FIG. 1 is an illustrative overall view of an image forming apparatus.
Figure 2:
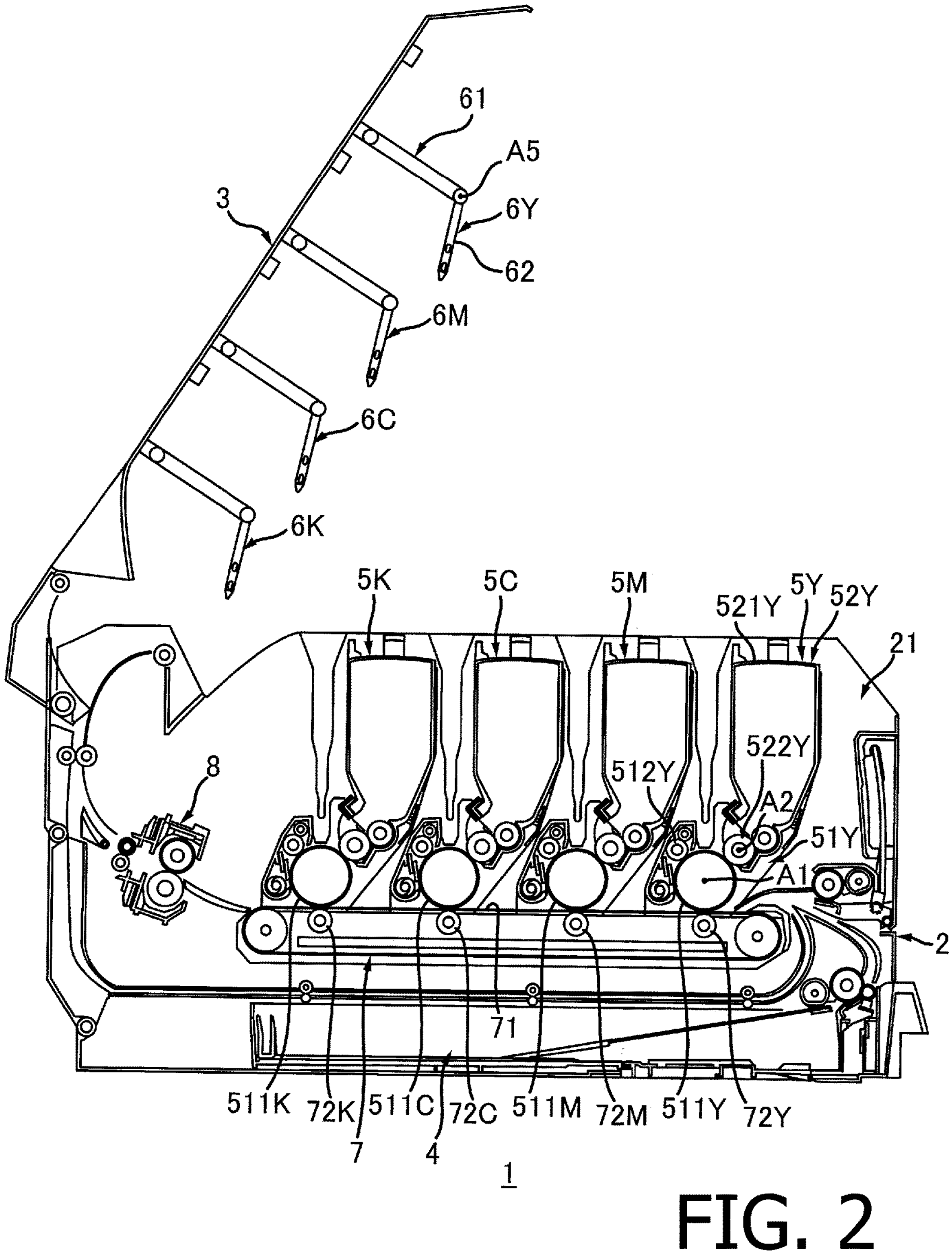
FIG. 2 is an illustrative view of the image forming apparatus with a cover located at a cover-open position.

With reference to FIGS. 1-2, an overall configuration of an image forming apparatus 1 will be described below.

As shown in FIG. 1, the image forming apparatus 1 includes a main-body housing 2, a cover 3, a sheet container 4, a plurality of process cartridges 5Y, 5M, 5C, 5K, a plurality of LED heads 6Y, 6M, 6C, 6K, a transfer device 7, and a fuser 8.

1.1 Main-Body Housing 2

The main-body housing 2 accommodates the sheet container 4, the process cartridges 5Y, 5M, 5C, 5K, the LED heads 6Y, 6M, 6C, 6K, the transfer device 7, and the fuser 8. The main-body housing 2 has an opening 21. The opening 21 is located in an upper area in the main-body housing 2.

1.2 Cover 3

As shown in FIGS. 1 and 2, the cover 3 may close and open the opening 21. In particular, the cover 3 may move between a cover-closed position (see FIG. 1) and a cover-open position (see FIG. 2). When the cover 3 is located at the cover-closed position, the cover 3 may close the opening 21. When the cover 3 is located at the cover-open position, the cover 3 may open the opening 21.

1.3 Sheet Container 4

As shown in FIG. 1, the sheet container 4 may contain one or more sheets S. The sheets S contained in the sheet container 4 may be conveyed toward a photosensitive drum 511Y, which will be described further below.

1.4 Process Cartridges 5Y, 5M 5C, 5K

As shown in FIG. 2, when the cover 3 is located at the cover-open position, the process cartridges 5Y, 5M 5C, 5K may be mounted in or demounted from the main-body housing 2 through the opening 21. The process cartridge 5M aligns with the process cartridge 5Y, in a state where the process cartridges 5M, 5Y are mounted in the main-body housing 2.

As shown in FIG. 1, the process cartridge 5Y includes a drum cartridge 51Y and a toner cartridge 52Y.

1.4.1 Drum Cartridge 51Y

The drum cartridge 51Y includes a photosensitive drum 511Y and a charger 512Y.

The photosensitive drum 511Y longitudinally extends in a first direction. The photosensitive drum 511Y has a cylindrical form. The photosensitive drum 511Y may be rotatable about a first axis A1. The first axis A1 extends in the first direction. The first direction intersects with a second direction, in which the process cartridge 5Y and the process cartridge 5M align. Preferably, the first direction may intersect orthogonally with the second direction.

The charger 512Y may charge the photosensitive drum 511Y. The charger 512Y may be, for example, a charger roller. The charger 512Y may be, for example, a scorotron-styled charger.

1.4.2 Toner Cartridge 52Y

The toner cartridge 52Y is attachable to the drum cartridge 51Y. The toner cartridge 52Y may, in a state where the toner cartridge 52Y is attached to the drum cartridge 51Y, supply toner to the photosensitive drum 511Y. The toner cartridge 52Y includes a toner casing 521Y and a developing roller 522Y.

The toner casing 521Y may contain the toner to be supplied to the photosensitive drum 511Y. In other words, the toner cartridge 52Y may contain the toner to be supplied to the photosensitive drum 511Y. The toner casing 521Y supports the developing roller 522Y.

In the state where the toner cartridge 52Y is attached to the drum cartridge 51Y, the developing roller 522Y may supply the toner in the toner casing 521Y to the photosensitive drum 511Y. In the state where the toner cartridge 52Y is attached to the drum cartridge 51Y, the developing roller 522Y contacts the photosensitive drum 511Y. In the state where the process cartridge 5Y is mounted in the main-body housing 2, the developing roller 522Y may be separable from the photosensitive drum 511Y, and the developing roller 522Y extends in the first direction. The developing roller 522Y is rotatable about a developer axis A2. The developer axis A2 extends in the first direction.

1.4.3 Process Cartridges 5M, 5C, 5K

The process cartridges 5M, 5C, 5K are each in the same structure as the process cartridge 5Y. In other words, the process cartridge 5M includes a drum cartridge 51M, which is in the same structure as the drum cartridge 51Y, and a toner cartridge 52M, which is in the same structure as the toner cartridge 52Y. The drum cartridge 51M includes a photosensitive drum 511M. The toner cartridge 52M is attachable to and detachable from the drum cartridge 51M. The further detailed description of the process cartridges 5M, 5C, 5K is herein omitted.

1.5 LED Heads 6Y, 6M, 6C, 6K

The LED heads 6Y, 6M, 6C, 6K are supported by the cover 3. In the state where the process cartridges 5Y, 5M, 5C, 5K are mounted in the main-body housing 2, with the cover 3 closing the opening 21, the LED head 6Y may emit exposure light at a circumferential surface of the photosensitive drum 511Y, the LED head 6M may emit exposure light at a circumferential surface of the photosensitive drum 511M, the LED head 6C may emit exposure light at a circumferential surface of the photosensitive drum 511C, and the LED head 6K may emit exposure light at a circumferential surface of the photosensitive drum 511K.

1.6 Transfer Device 7

The transfer device 7 includes a plurality of transfer rollers 72Y, 72M, 72C, 72K.

In the state where the process cartridge 5Y is mounted in the main-body housing 2, the belt 71 contacts the photosensitive drum 511Y. In the state where the process cartridge 5M is attached to the main-body housing 2, the belt 71 contacts the photosensitive drum 511M. In the state where the process cartridge 5C is attached to the main-body housing 2, the belt 71 contacts the photosensitive drum 511C. In the state where the process cartridge 5K is attached to the main-body housing 2, the belt 71 contacts the photosensitive drum 511K. The belt 71 may convey the sheet S fed from the sheet container 4 toward the fuser 8.

The transfer roller 72Y may transfer the toner on the photosensitive drum 511Y to the sheet S being conveyed by the belt 71. The transfer roller 72M may transfer the toner on the photosensitive drum 511M to the sheet S being conveyed by the belt 71. The transfer roller 72C may transfer the toner on the photosensitive drum 511C to the sheet S being conveyed by the belt 71. The transfer roller 72K may transfer the toner on the photosensitive drum 511K to the sheet S being conveyed by the belt 71.

1.7 Fuser 8

The fuser 8 may apply heat and pressure to the sheet S having the toners transferred from the photosensitive drums 511Y, 511M, 511C, 511K. The sheet S exiting the fuser 8 may be ejected on an upper face of the cover 3.

2. DETAILED CONFIGURATION OF DRUM CARTRIDGE 51Y

Detailed configuration of the drum cartridge 51Y will be described below with reference to FIGS. 3-8.

Figure 3:
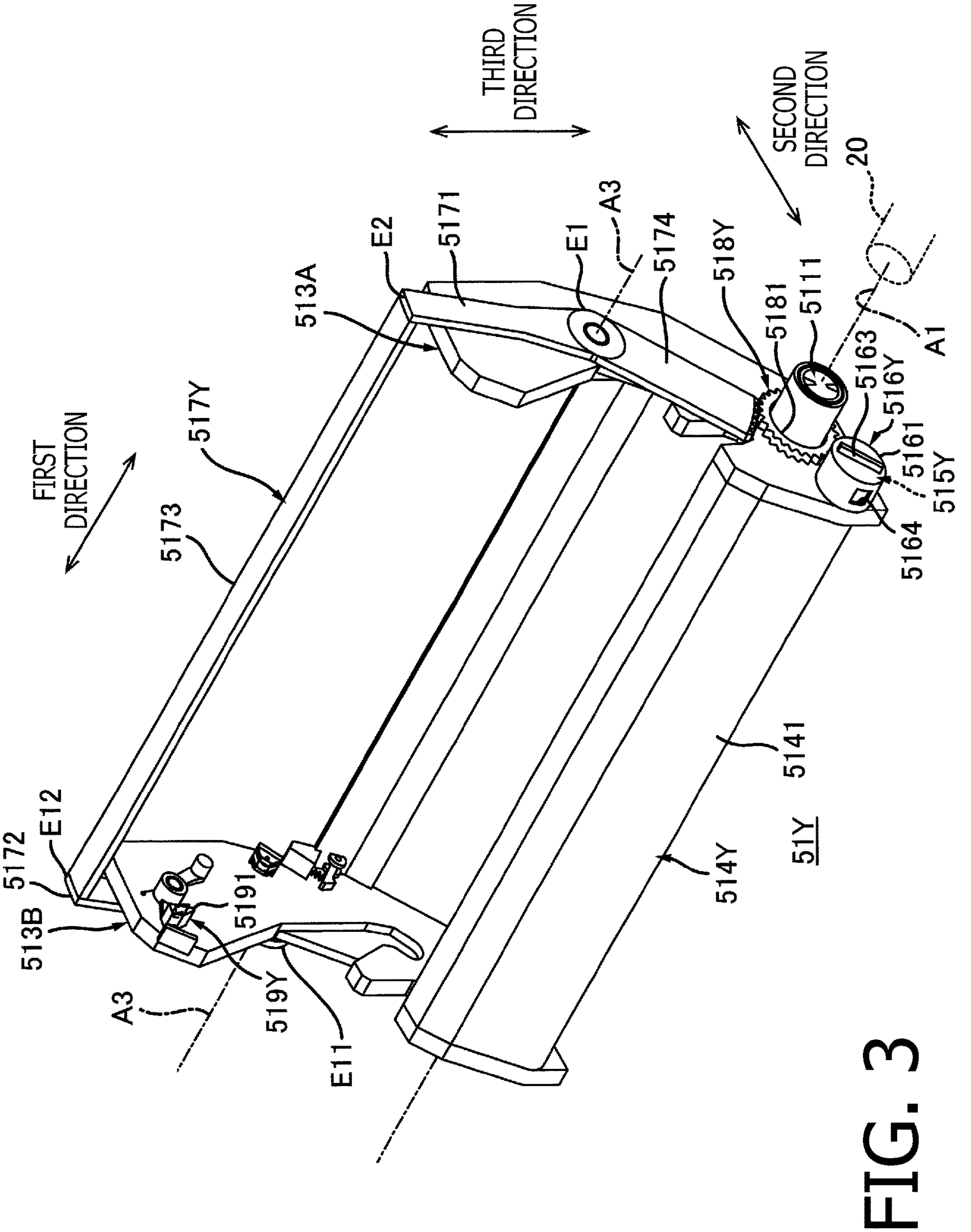
FIG. 3 is a perspective view of a drum cartridge.

As shown in FIG. 3, the drum cartridge 51Y includes, further to the photosensitive drum 511Y and the charger 512 described above, a first side plate 513A, a second side plate 513B, a drum cleaner 514Y, an outlet 515Y, an outlet shutter 516Y, a lever 517Y, a transmission member 518Y, and a locking member 519Y.

2.1 First Side Plate 513A and Second Side Plate 513B

The first side plate 513A is located at one end of the drum cartridge 51Y on one side in the first direction. The first side plate 513A supports the photosensitive drum 511Y at one end on the one side in the first direction. The first side plate 513A extends in a third direction, which intersects with both the first direction and the third direction. Preferably, the third direction may intersect orthogonally with the first direction and the second direction.

The second side plate 513B is located at the other end of the drum cartridge 51Y on the other side in the first direction. The second side plate 513B is spaced apart from the first side plate 513A in the first direction. The second side plate 513B supports the photosensitive drum 511Y at the other end on the other side in the first direction. The second side plate 513B extends in the third direction.

2.2 Drum Cleaner 514Y

The drum cleaner 514Y is located between the first side plate 513A and the second side plate 513B in the first direction. The drum cleaner 514Y extends in the first direction. One end of the drum cleaner 514Y in the first direction is connected to the first side plate 513A. The other end of the drum cleaner 514Y in the first direction is connected to the second side plate 513B. The drum cleaner 514Y may clean a circumferential surface of the photosensitive drum 511Y.

Figure 4:
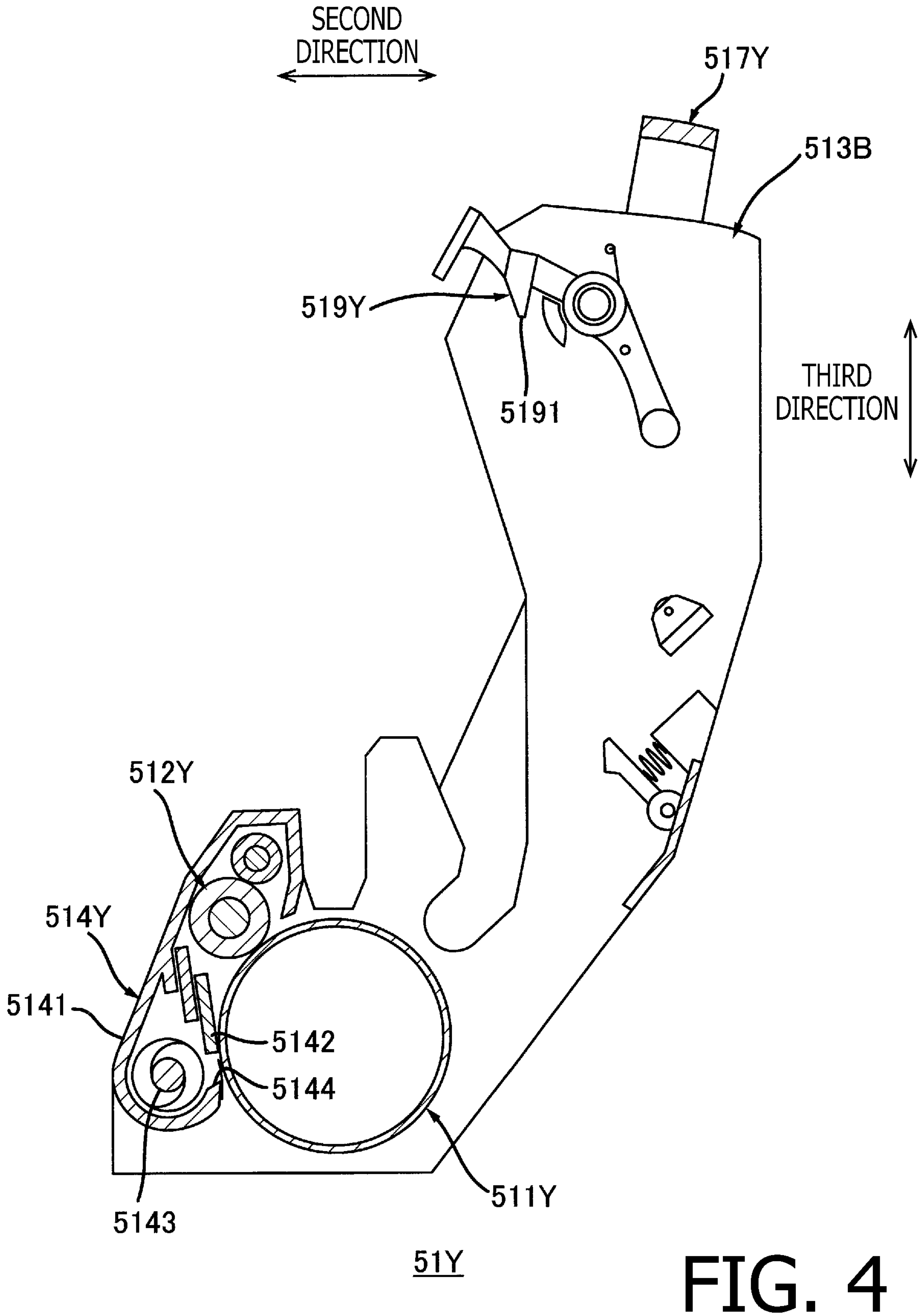
FIG. 4 is a cross-sectional view of the drum cartridge sectioned at a center in a first direction.

As shown in FIG. 4, the drum cleaner 514Y includes a cleaner casing 5141, a cleaning member 5142, and a waste toner conveying member 5143.

2.2.1 Cleaner Casing 5141

As shown in FIG. 3, the cleaner casing 5141 is located between the first side plate 513A and the second side plate 513B in the first direction. The cleaner casing 5141 extends in the first direction. One end of the cleaner casing 5141 in the first direction is connected to the first side plate 513A. The other end of the cleaner casing 5141 is connected to the second side plate 513B. The cleaner casing 5141 may store waste toner. As shown in FIG. 4, the cleaner casing 5141 has an opening 5144.

2.2.2 Cleaning Member 5142

The cleaning member 5142 is attached to the cleaner casing 5141. The cleaning member 5142 extends in the first direction. The cleaning member 5142 has a form of a plate. An edge of the cleaning member 5142 contacts the circumferential surface of the photosensitive drum 511Y. As the photosensitive drum 511Y rotates, waste toner adhered to the circumferential surface of the photosensitive drum 511Y may contact the edge of the cleaning member 5142 and may be scraped off from the circumferential surface of the photosensitive drum 511Y. Thus, the cleaning member 5142 may clean the circumferential surface of the photosensitive drum 511Y. The waste toner removed from the photosensitive drum 511Y may be collected in the cleaner casing 5141 through the opening 5144.

2.2.3 Waste Toner Conveying Member 5143

The waste toner conveying member 5143 is located inside the cleaner casing 5141. The waste toner conveying member

5143 may convey the waste toner collected in the cleaner casing 5141 in the first direction toward the outlet 515Y (see FIG. 3). The waste toner conveying member 5143 may be, for example, an auger screw. The waste toner conveying member 5143 extends in the first direction.

2.3 Outlet 515Y

Figure 5:
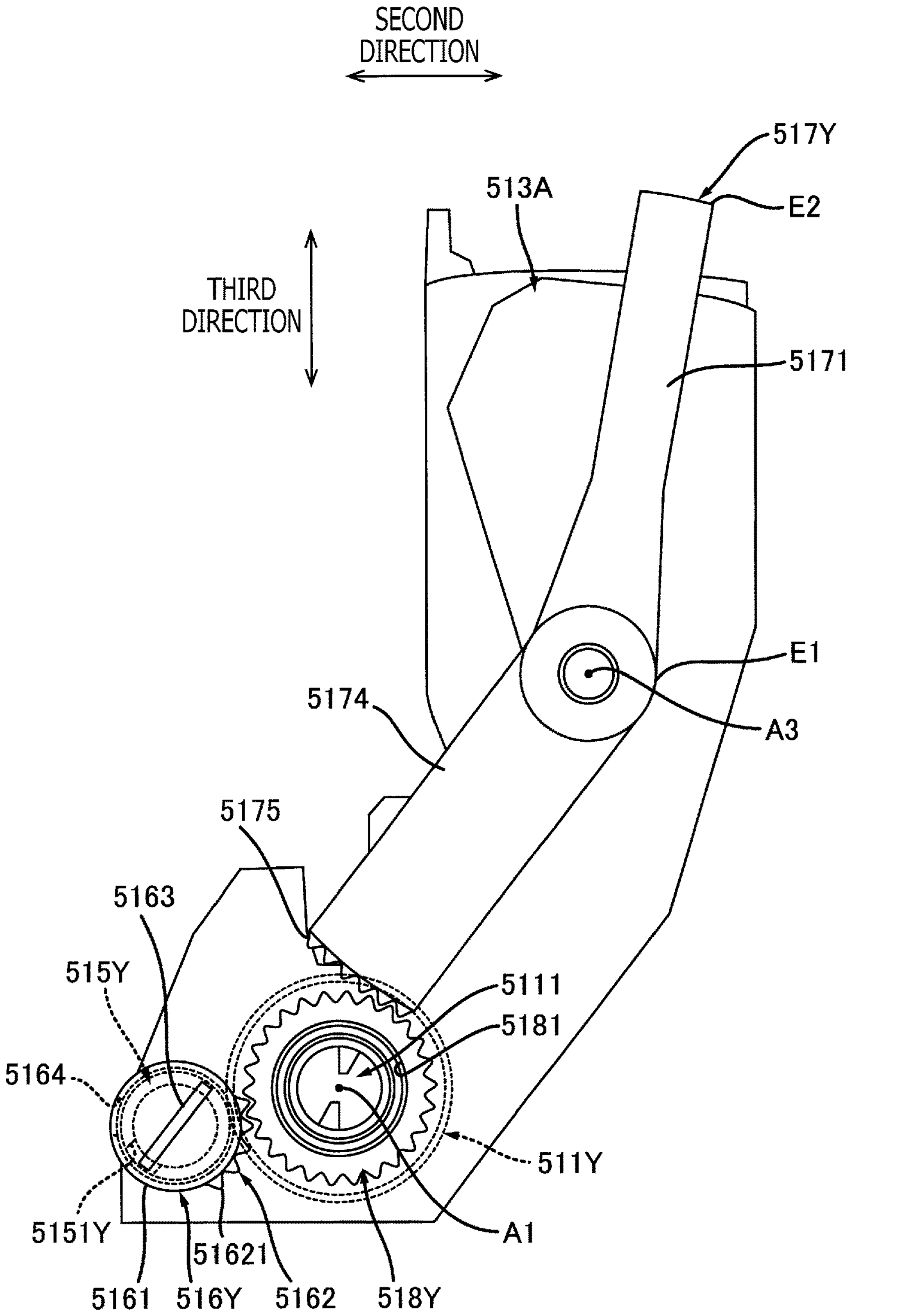
FIG. 5 is a sideward view of the drum cartridge with a lever located at a first position.

As shown in FIG. 3, the outlet 515Y is located on a side of the first side plate 513A opposite to the second side plate 513B in the first direction. The outlet 515Y extends from the first side plate 513A in the first direction. The outlet 515Y may be attached to the first side plate 513A. The outlet 515Y has a cylindrical form. A space inside the outlet 515Y is continuous with a space inside the cleaner casing 5141. In the state where the toner cartridge 52Y is attached to the drum cartridge 51Y (see FIG. 1), the outlet 515Y is located on a side of the photosensitive drum 511Y opposite to the toner cartridge 52Y. In the state where the process cartridge 5Y is mounted in the main-body housing 2, with the cover 3 closing the opening 21 (see FIG. 1), the outlet 515Y is located on a side of the LED head 6Y opposite to the toner cartridge 52Y. As shown in FIG. 5, the outlet 515Y has an outlet opening 5151Y.

The outlet opening 5151Y is continuous with the space inside the outlet 515Y. Through the outlet opening 5151Y, the waste toner may be discharged from the outlet 515Y. Thus, through the outlet opening 5151Y, the waste toner in the drum cleaner 514Y may be discharged outside the outlet 515Y.

2.4 Outlet Shutter 516Y

As shown in FIG. 3, the outlet shutter 516Y is located on a side of the first side plate 513A opposite to the second side plate 513B in the first direction. The outlet shutter 516Y is attached to the outlet 515Y. Accordingly, in the state where the process cartridge 5Y is mounted in the main-body housing 2, with the cover 3 closing the opening 21 (see FIG. 1), the outlet shutter 516Y is located on a side of the LED head 6Y (see FIG. 1) opposite to the toner cartridge 52Y (see FIG. 1). In other words, in the state where the process cartridge 5Y is mounted in the main-body housing 2, with the cover 3 closing the opening 21, the toner cartridge 52Y is located on a side of the LED head 6Y opposite to the outlet shutter 516Y.

Figure 6:
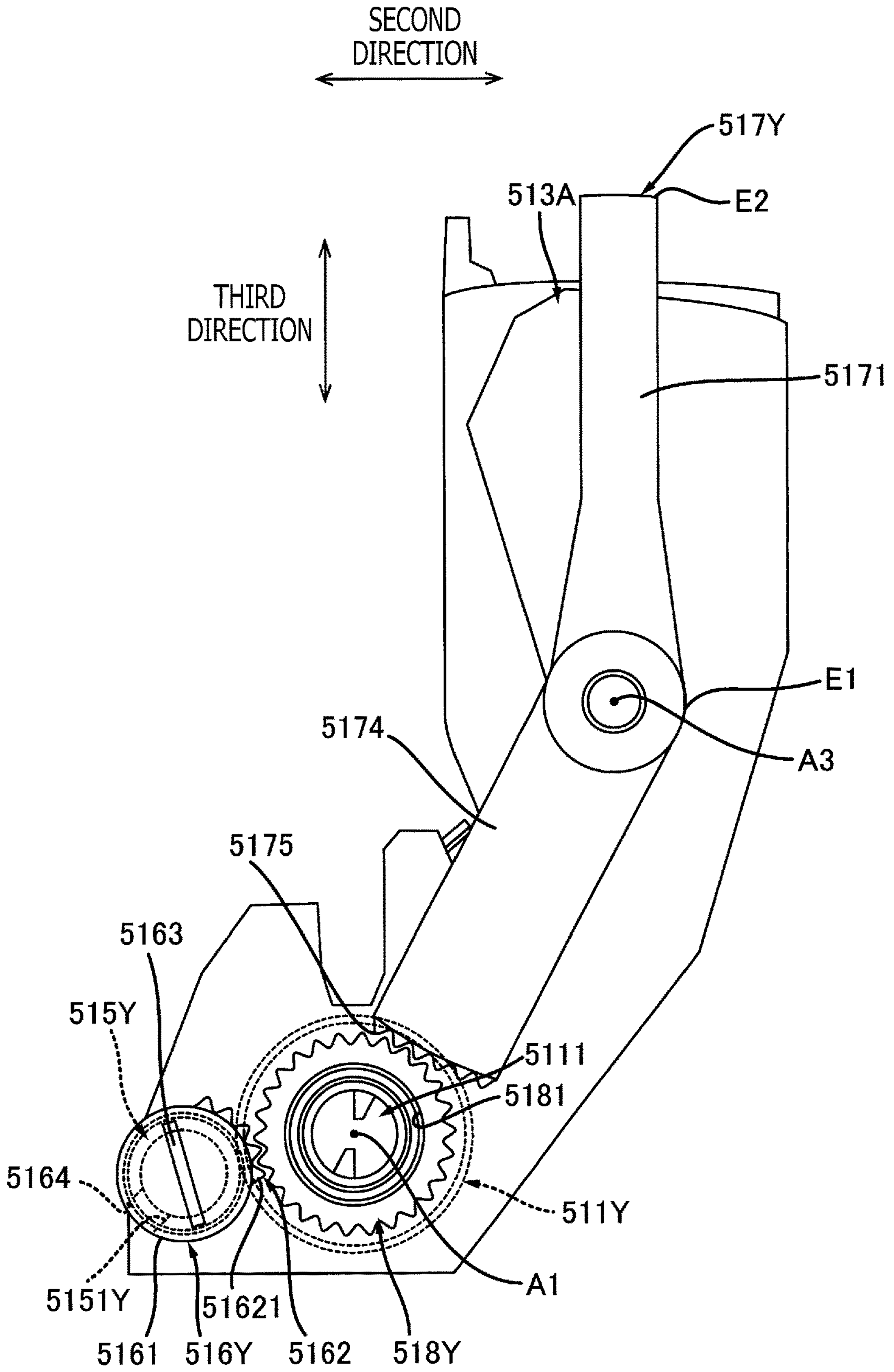
FIG. 6 is a sideward view of the drum cartridge with the lever located at a second position.

As shown in FIGS. 5 and 6, the outlet shutter 516Y may open and close the outlet opening 5151. The outlet shutter 516Y is movable between an outlet-shutter closed position (see FIG. 5) and an outlet-shutter open position (see FIG. 6). The outlet shutter 516Y is rotatable with respect to the outlet 515Y between the outlet-shutter closed position and the outlet-shutter open position. As shown in FIG. 5, in the state where the outlet shutter 516Y is located at the outlet-shutter closed position, the outlet shutter 516Y may close the outlet opening 5151Y. As shown in FIG. 6, in the state where the outlet shutter 516Y is located at the outlet-shutter open position, the outlet opening 5151Y may open. The outlet shutter 516Y includes a shutter body 5161, a receiver 5162, and an engaging portion 5163.

2.4.1 Shutter Body 5161

As shown in FIG. 3, the shutter body 5161 extends in the first direction. The shutter body 5161 has a cylindrical form. The shutter body 5161 is movable along with the engaging portion 5163. The shutter body 5161 has a shutter opening 5164.

As shown in FIG. 6, in the state where the outlet shutter 516Y is located at the outlet-shutter open position, the shutter opening 5164 is at least partly continuous with the outlet opening 5151Y. Therefore, in the state where the outlet shutter 516Y is located at the outlet-shutter open position, the outlet opening 5151Y opens. On the other hand, as shown in FIG. 5, in the state where the outlet shutter 516Y is located at the outlet-shutter closed position, the shutter opening 5164 is located separately from the outlet opening 5151Y. In the state where the outlet shutter 516Y is located at the outlet-shutter closed position, the shutter opening 5164 is not continuous with the outlet opening 5151. Accordingly, in the state where the outlet shutter 516Y is located at the outlet-shutter closed position, the outlet shutter 516Y closes the outlet opening 5151Y.

2.4.2 Receiver 5162

As shown in FIG. 5, the receiver 5162 is located on a circumferential surface of the shutter body 5161. The receiver 5162 extends in a circumferential direction of the shutter body 5161. The receiver 5162 extends in the movable direction of the outlet shutter 516Y. The receiver 5162 has gear teeth 51621. The gear teeth 51621 are located apart from gear teeth 5175 in the lever 517. The gear teeth 5175 will be described further below.

2.4.3 Engaging Portion 5163

As shown in FIG. 3, the engaging portion 5163 is located on a sideward surface of the shutter body 5161 in the first direction. The engaging portion 5163 extends in the first direction from the sideward surface of the shutter body 5161. The engaging portion 5163 may be, for example, a rib. The engaging portion 5163 extends in a radial direction of the shutter body 5161.

2.5 Lever 517Y

The lever 517Y may be operated by a user to open and close the outlet shutter 516Y. As shown in FIGS. 5 and 6, the lever 517Y is pivotable on an axis A3 between a first position (see FIG. 5) and a second position (see FIG. 6). The axis A3 extends in the first direction. The axis A3 is located on a side of the first axis A1 opposite to the outlet shutter 516Y in the second direction. As shown in FIG. 5, in a state where the lever 517Y is located at the first position, the outlet shutter 516Y closes the outlet opening 5151Y. In other words, the lever 517Y at the first position places the outlet shutter 516Y closing the outlet opening 5151Y. As shown in FIG. 6, in a state where the lever 517Y is located at the second position, the outlet shutter 516Y opens the outlet opening 5151Y. In other words, the lever 517Y at the second position places the outlet shutter 516Y opening the outlet opening 5151Y.

As shown in FIG. 3, the lever 517Y has a first arm 5171, a second arm 5172, a grip 5173, and a third arm 5174.

The first arm 5171 is supported by the first side plate 513A. The first arm 5171 is located on a side of the first axis A1 opposite to the outlet shutter 516Y in the second direction. The first arm 5171 extends in the third direction. The first arm 5171 has one end portion E1 and the other end portion E2 located on one end and the other end, respectively, of the first arm 5171 in the third direction. The other end portion E2 is located apart from the one end portion E1 in the third direction. The one end portion E1 is supported by the first side plate 513A. The axis A3 is located in the one end portion E1.

The second arm 5172 is supported by the second side plate 513B. The second arm 5172 is located apart from the first arm 5171 in the first direction. The second arm 5172 extends in the third direction. The second arm 5172 has one end portion E11 and the other end portion E12 located on one end and the other end, respectively, of the second arm 5172 in the third direction. The other end portion E12 is located apart from the one end portion E11 in the third direction. The one end portion E11 is supported by the second side plate 513B. The axis A3 is located in the one end portion E11.

The grip 5173 is located between the other end portion E2 of the first arm 5171 and the other end portion E12 of the second arm 5172 in the first direction. The grip 5173 extends in the first direction. One end of the grip 5173 located on the one side in the first direction is connected to the other end portion E2 of the first arm 5171. The other end of the grip 5173 located on the other side in the first direction is connected to the other end portion E12 of the second arm 5172.

The third arm 5174 extends from the one end portion E1 of the first arm 5171 toward the transmission member 518Y As shown in FIG. 5, the third arm 5174 has the gear teeth 5175. In other words, the lever 517Y has the gear teeth 5175. The gear teeth 5175 are located at a tip of the third arm 5174. The gear teeth 5175 align along a movable direction of the lever 517Y.

2.6 Transmission Member 518Y

The transmission member 518Y is located between the lever 5157Y and the outlet shutter 516Y. The transmission member 518Y may transmit power from the lever 517Y to the receiver 5162. In other words, the receiver 5162 may receive power from the lever 517Y through the transmission member 518Y The transmission member 518Y may be, for example, an idle gear. The transmission member 518Y meshes with the gear teeth 5175 in the lever 517Y and gear teeth 51621 in the receiver 5162. The transmission member 518Y is rotatable about the first axis A1. The transmission member 518Y overlaps the photosensitive drum 511Y in the first direction.

More specifically, the photosensitive drum 511Y has a coupling 5111. As shown in FIG. 3, the coupling 5111 is located on one end of the photosensitive drum 511Y on the one side in the first direction. The coupling 5111 extends in the first direction. The coupling 5111 has a cylindrical form. In the state where the process cartridge 5Y is mounted in the main-body housing 2, the coupling 5111 is connected to a main-body housing coupling 20 in the main-body housing 2 along the first direction. In a state where the coupling 5111 is connected to the main-body housing coupling 20, the photosensitive drum 511Y may rotate on the first axis A1 along with the main-body housing coupling 20.

The transmission member 518Y has a through hole 5181. The coupling 5111 of the photosensitive drum 511Y is located inside the through hole 5181. The coupling 5111 of the photosensitive drum 511Y protrudes in the first direction through the through hole 5181. The transmission member 5181Y may rotate on the first axis A1 around the coupling 5111.

2.7 Locking Member 519Y

As shown in FIG. 3, the locking member 519Y is located between the first side plate 513A and the second side plate 513B in the first direction. The locking member 519Y is attached to the second side plate 513B. In the state where the toner cartridge 52Y is attached to the drum cartridge 51Y, the locking member 519Y locks the toner cartridge 52Y to the drum cartridge 51Y.

Figure 7:
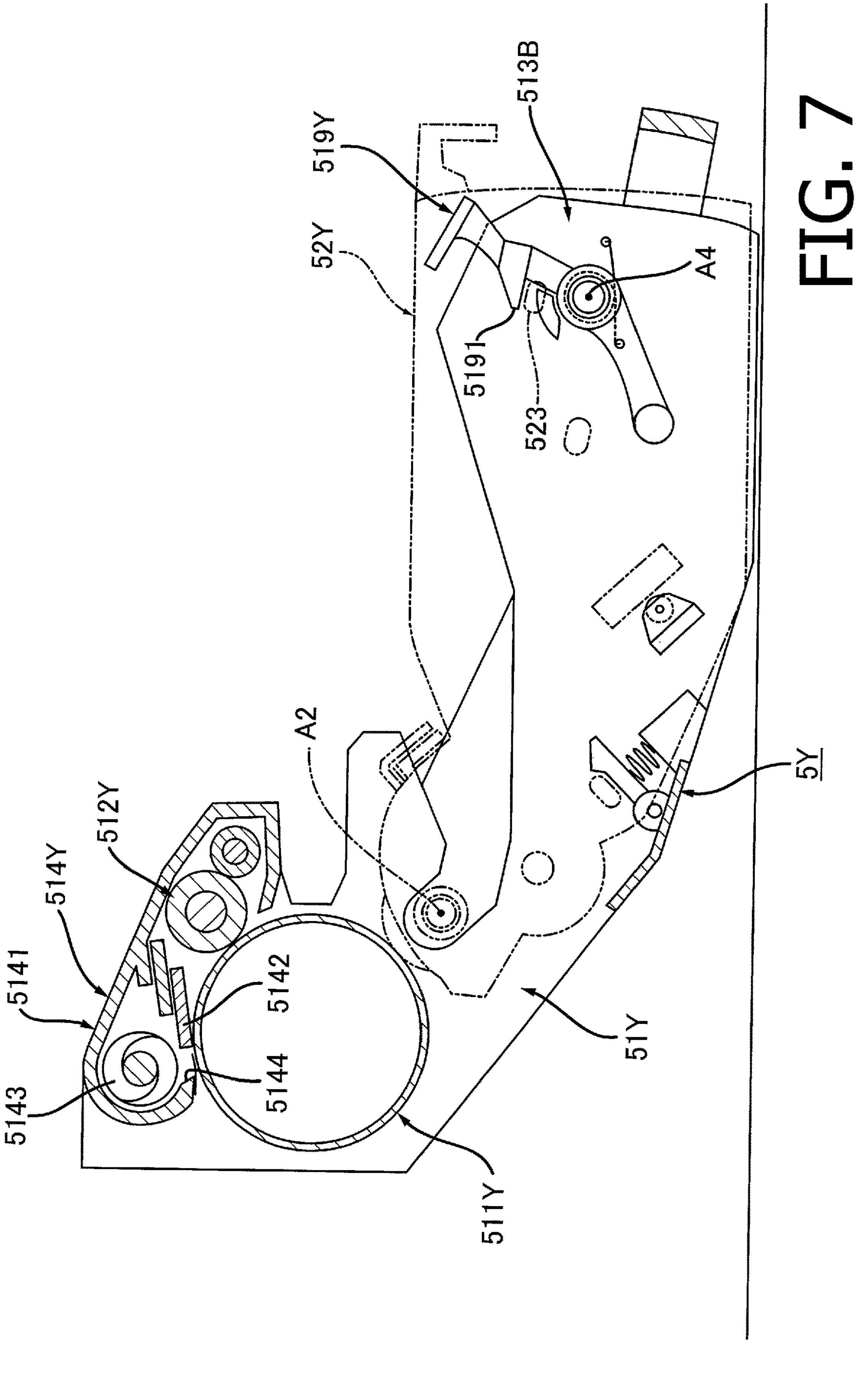
FIG. 7 is an illustrative view of a process cartridge demounted from a main-body housing with a toner cartridge located at a cartridge-first position.
Figure 8:
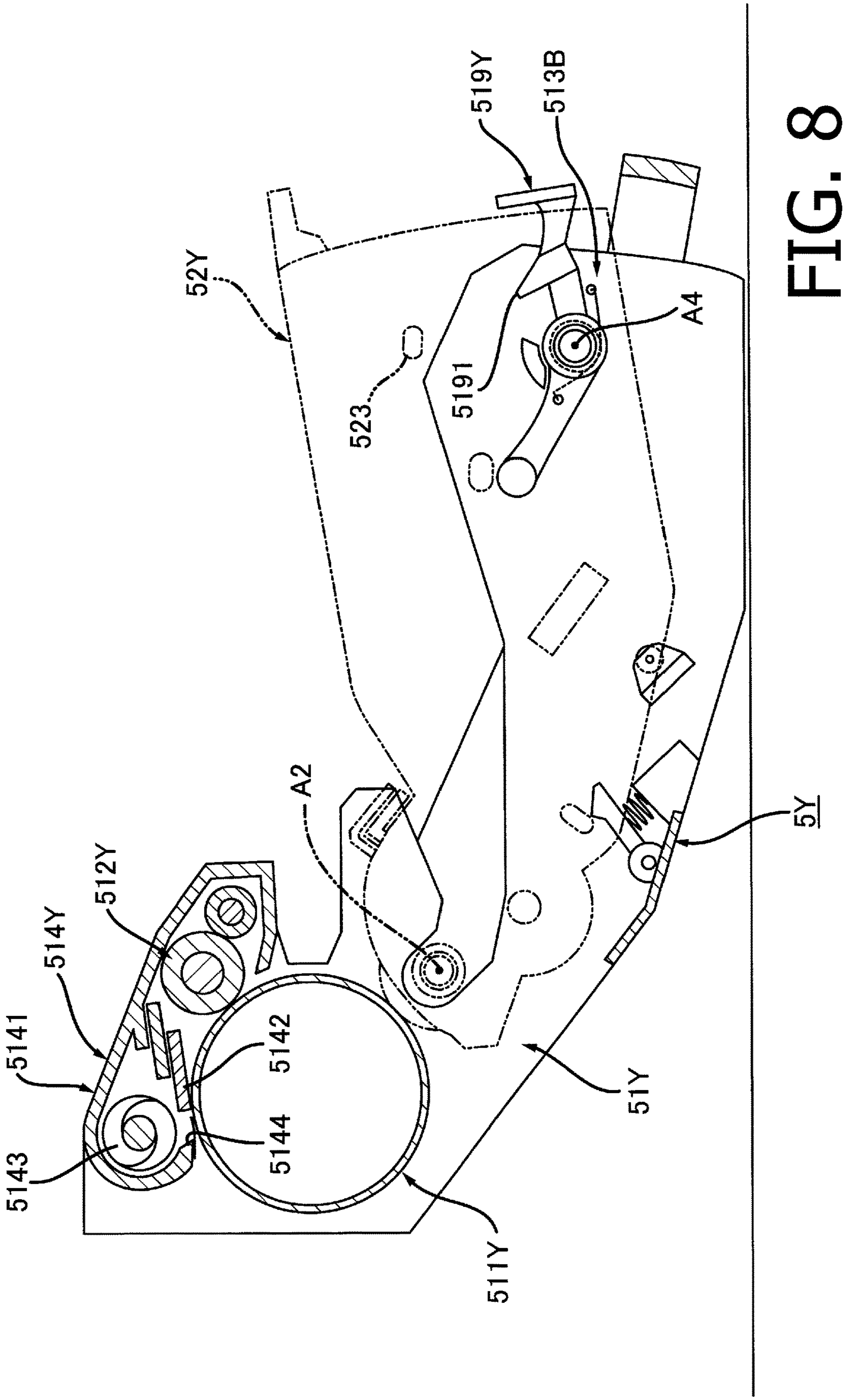
FIG. 8 is an illustrative view of the process cartridge demounted from the main-body housing with the toner cartridge located at a cartridge-second position.

In particular, as shown in FIGS. 7 and 8, in a state where the process cartridge 5Y is demounted from the main-body housing 2, with the toner cartridge 52Y being attached to the drum cartridge 51Y, the toner cartridge 52Y is movable between a cartridge-first position (see FIG. 7) and a cartridge-second position (see FIG. 8). The toner cartridge 52Y is pivotable on a developer axis A2 between the cartridge-first position and the cartridge-second position. As shown in FIG. 7, in the state where the toner cartridge 52Y is located at the cartridge-first position, the toner cartridge 52Y is undetachable from the drum cartridge 51Y. As shown in FIG. 8, in the state where the toner cartridge 52Y is located at the cartridge-second position, the toner cartridge 52Y is detachable form the drum cartridge 51Y. In other words, the toner cartridge 52Y is attachable to and detachable from the drum cartridge 51Y in the state where the process cartridge 5Y is demounted from the main-body housing 2.

The locking member 519Y is movable between a locking position (see FIG. 7) and an unlocking position (see FIG. 8). The locking member 519Y is pivotable on an axis A4 between the locking position and the unlocking position. The axis A4 extends in the first direction. As shown in FIG. 7, in the state where the locking member 519Y is located at the locking position, the locking member 519Y locks the toner cartridge 52Y at the cartridge-first position.

In particular, the locking member 519Y has a contact portion 5191. In the state where the toner cartridge 52Y is attached to the drum cartridge 51Y, with the locking member 519Y being located at the locking position, the contact portion 5191 faces a part 523 of the toner cartridge 52Y in a movable direction of the toner cartridge 52Y to move from the cartridge-first position to the cartridge-second position. In the state where the toner cartridge 52Y is attached to the drum cartridge 51Y, with the locking member 519Y being located at the locking position, when the toner cartridge 52Y tends to move from the cartridge-first position to the cartridge-second position, the contact portion 5191 contacts the part 523 of the toner cartridge 52Y and restricts the toner cartridge 52Y from moving from the cartridge-first position to the cartridge-second position. Thereby, the locking member 519Y locks the toner cartridge 52Y to the cartridge-first position.

On the other hand, as shown in FIG. 8, in the state where the locking member 519Y is located at the unlocking position, the locking member 519Y unlocks the toner cartridge 52Y from the cartridge-first position.

In particular, in the state where the toner cartridge 52Y is attached to the drum cartridge 51Y, with the locking member 519 being located at the unlocking position, the contact portion 5191 does not face the part 523 of the toner cartridge 52Y in the movable direction of the toner cartridge 52Y to move from the cartridge-first position to the cartridge-second position. Therefore, in the state where the toner cartridge 52Y is attached to the drum cartridge 51Y, with the locking member 519 being located at the unlocking position, the toner cartridge 52Y is detachable from the drum cartridge 51Y.

2.8 Drum Cartridges 51M, 51C, 51K

As described above, the drum cartridges 51Y, 51M, 51C, 51K are in the same structure. In other words, the drum cartridge 51M has a drum cleaner 514M, which is in the same structure as the drum cleaner 514Y (see FIGS. 3 and 4), an outlet 515M, which is in the same structure as the outlet 515Y (see FIGS. 3 and 5), and an outlet shutter 516M, which is in the same structure as the outlet shutter 516Y (see FIG. 3). The drum cleaner 514M may clean a circumferential surface of the photosensitive drum 511M. The outlet 515M has an outlet opening 5151M. Through the outlet opening 5151M, the waste toner in the drum cleaner 514M may be discharged. The outlet shutter 516M may open and close the outlet opening 5151M. Further description of the drum cartridges 51M, 51C, 51K is herein omitted.

3. DETAILED CONFIGURATION OF IMAGE FORMING APPARATUS 1

Next, detailed configuration of the image forming apparatus 1 will be described with reference to FIGS. 9-11.

Figure 9:
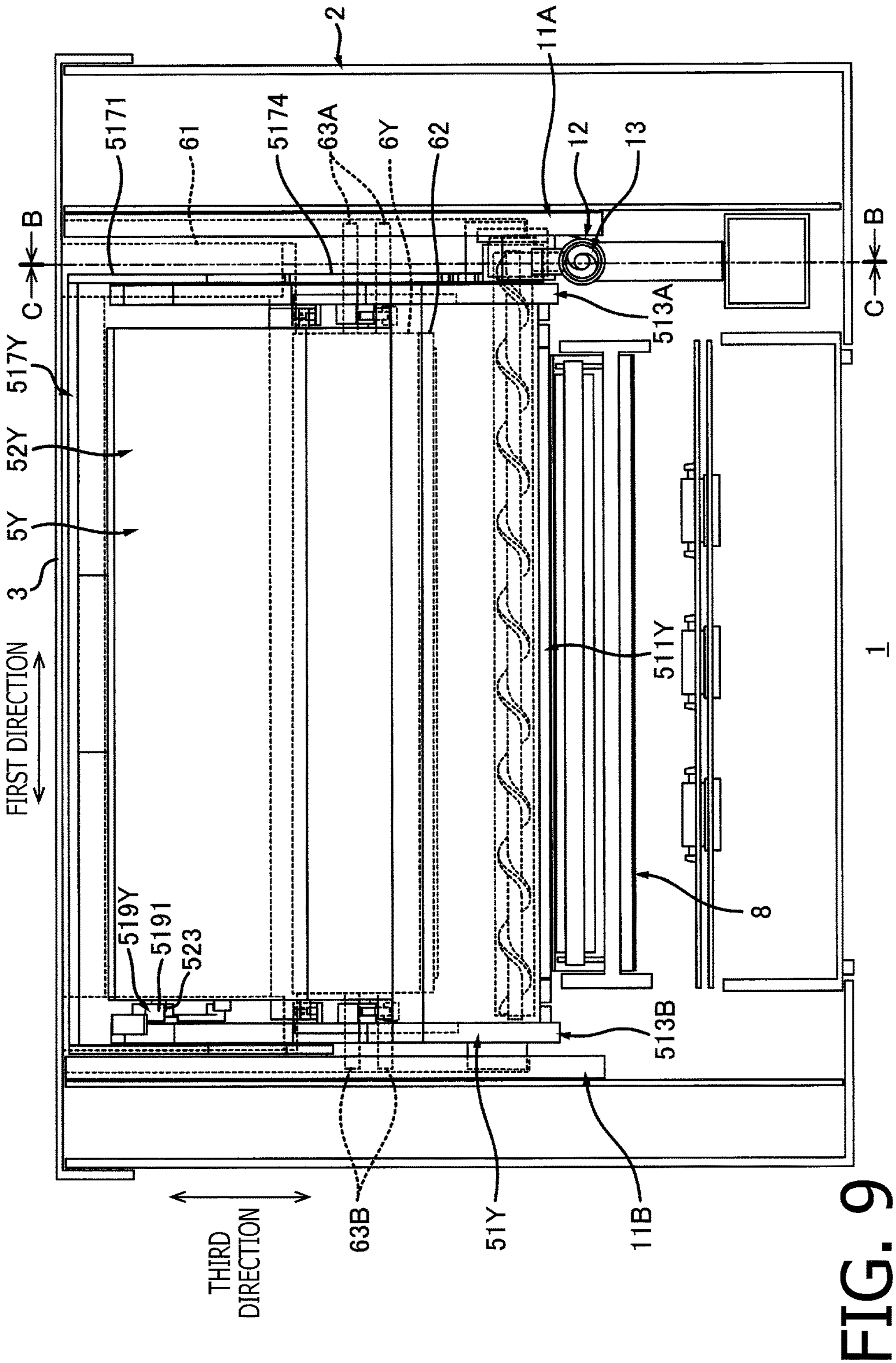
FIG. 9 is a cross-sectional view of the image forming apparatus sectioned at a line A-A indicated in FIG. 1.
Figure 10:
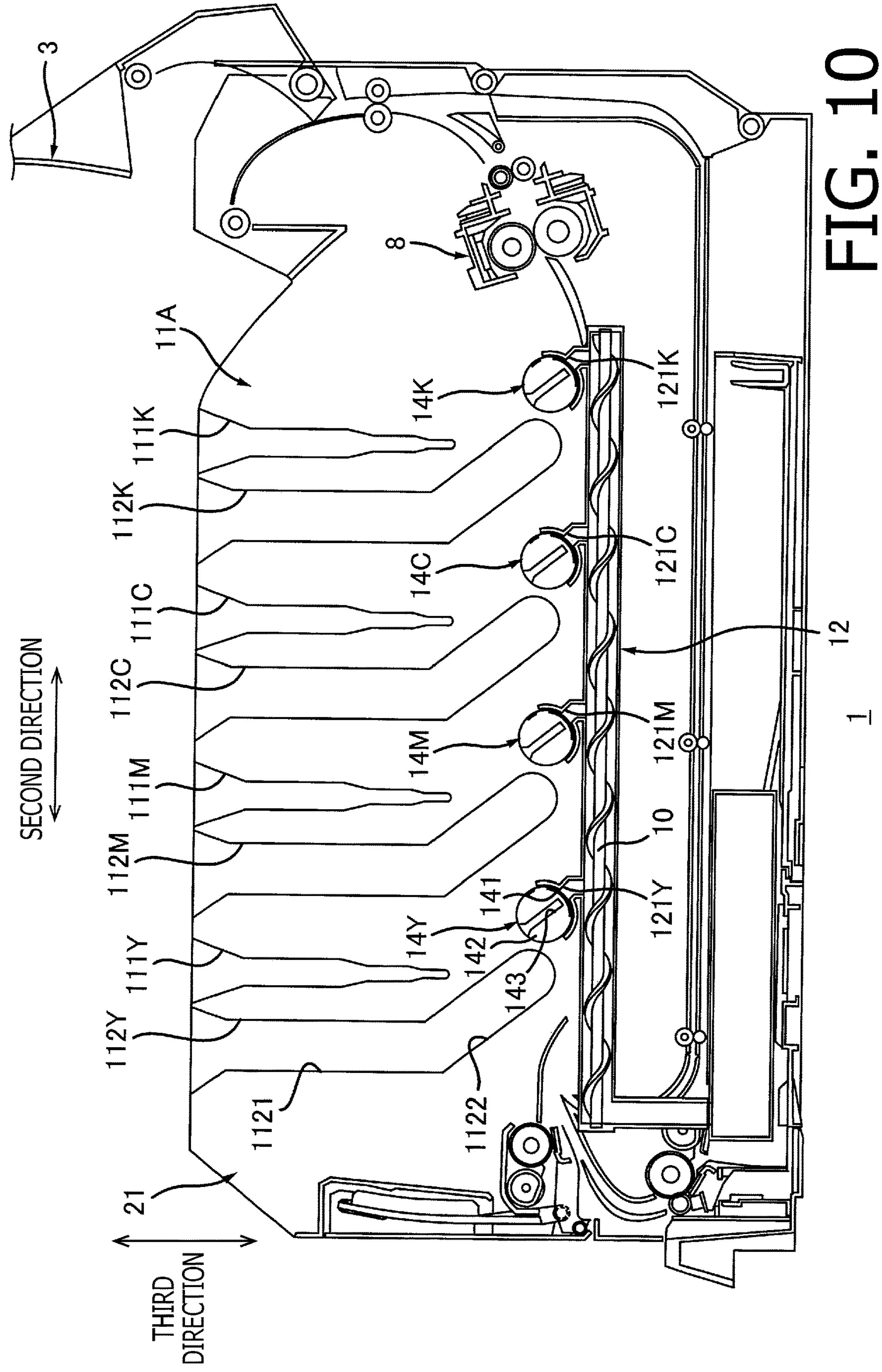
FIG. 10 is a cross-sectional view of the image forming apparatus sectioned at a line C-C indicated in FIG. 9, with the process cartridges removed from the main-body housing.
Figure 11:
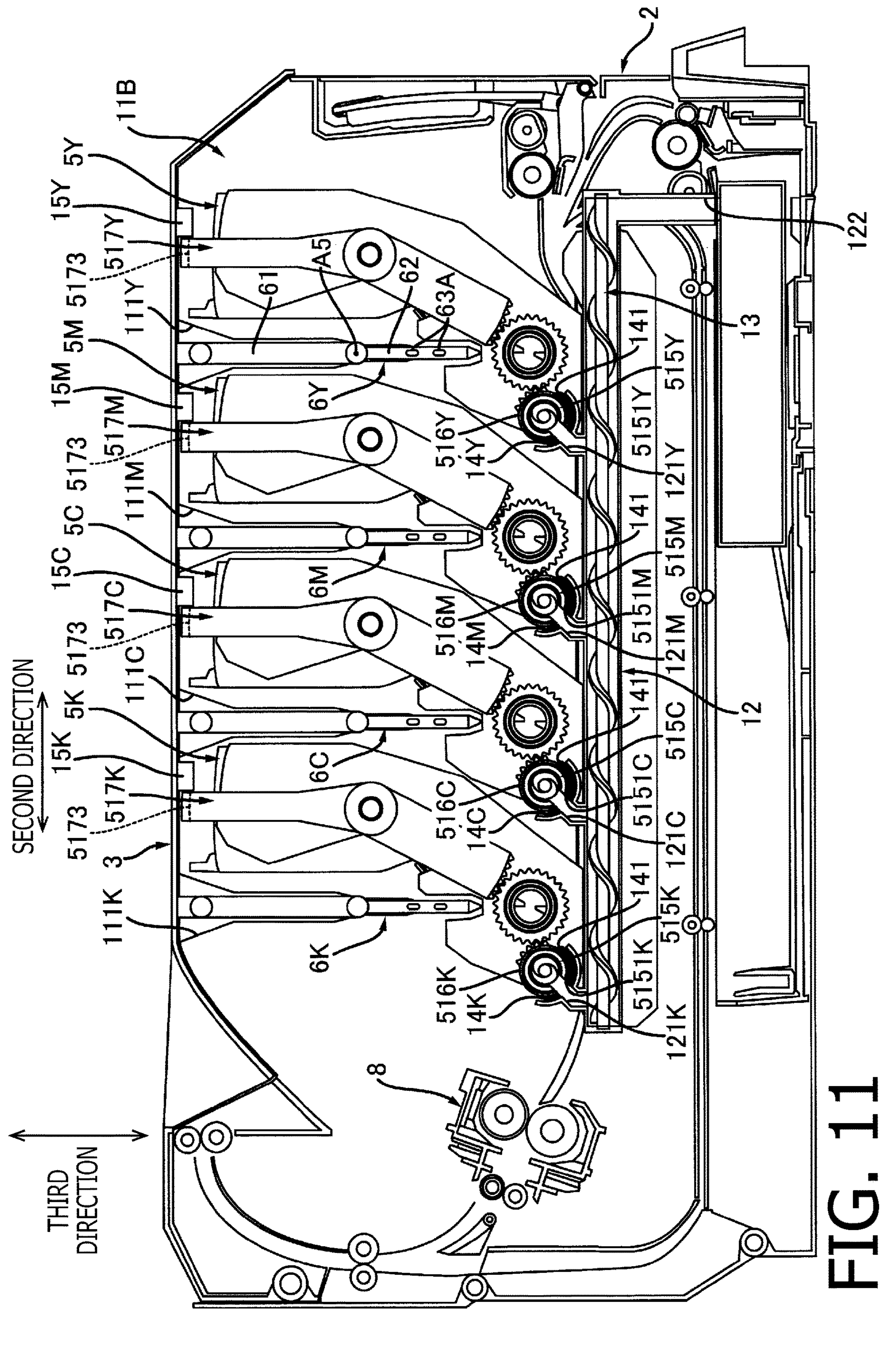
FIG. 11 is a cross-sectional view of the image forming apparatus sectioned at a line B-B indicated in FIG. 9.

As shown in FIG. 9, the image forming apparatus 1 further has a main-body side plate 11A, a main-body side plate 11B, a waste toner tube 12, a conveying member 13, a plurality of inlet shutters 14Y, 14M, 14C, 14K (see FIG. 10), and a plurality of stoppers 15Y, 15M, 15C, 15K (see FIG. 11).

3.1 Main-Body Side Plate 11A

As shown in FIG. 9, the main-body side plate 11A is located inside the main-body housing 2. The main-body side plate 11A extends in the third direction. As shown in FIG. 10, the main-body side plate 11A has a plurality of guides 111Y, 111M, 111C, 111K, a plurality of drum guides 112Y, 112M, 112C, 112K. In other words, the image forming apparatus 1 has a guide 11Y.

As shown in FIG. 9, in the state where the process cartridge 5Y is mounted in the main-body housing 2, the main-body side plate 11A faces one end of the process cartridge 5Y on the one side in the first direction. In the state where the process cartridge 5Y is mounted in the main-body housing 2, the main-body side plate 11A is located apart from the one end of the process cartridge 5Y in the first direction. In other words, in the state where the process cartridge 5Y is mounted in the main-body housing 2, the guide 111Y is located apart from the first side plate 513A of the drum cartridge 51Y in the first direction. In the state where the process cartridge 5Y is mounted in the main-body housing 2, the first arm 5171 and the third arm 5174 of the lever 517Y are located between the first side plate 513A and the main-body side plate 11A in the first direction. In other words, in the state where the process cartridge 5Y is mounted in the main-body housing 2, at least a part of the lever 517Y is located between the first side plate 513A and the guide 111Y in the first direction.

3.1.1 Guides 111Y, 111M, 111C, 111K

As shown in FIG. 11, in the state where the process cartridge 5Y and the process cartridge 5M are mounted in the main-body housing 2, the guide 111Y is located between the process cartridge 5Y and the process cartridge 5M in the second direction. In this arrangement, when the cover 3 moves between the cover-closed position and the cover-open position, the guide 111Y may guide the LED head 6Y so that the LED head 6Y may not contact the process cartridge 5Y or the process cartridge 5M.

In particular, as shown in FIGS. 9 and 11, the LED head 6Y includes a first frame 61, a second frame 62, a plurality of guided portions 63A, and a plurality of guided portions 63B.

The first frame 61 is attached to the cover 3. The first frame 61 is fixed to the cover 3. In the state where the cover 3 is located at the cover-closed position, the first frame 61 extends in the third direction.

The second frame 62 extends in the first direction. The second frame 62 supports an LED array. The second frame 62 is supported by the first frame 61. The second frame 62 is pivotable with respect to the first frame 61 on an axis A5.

As shown in FIG. 9, the guided portions 63A are located on one end of the LED head 6Y on the one side in the first direction. The guided portions 63A extend from the one end of the first frame 61 in the first direction. The guided portions 63A may be attached to the one end of the first frame 61 in the first direction. The guided portions 63A extend in the first direction. When the cover 3 opens or closes, the guided portions 63A may be guided by the guide 111Y (see FIG. 10) in the main-body side plate 11A.

The guided portions 63B are located on the other end of the LED head 6Y on the other side in the first direction. The guided portions 63B extend from the other end of the first frame 61 in the first direction. The guided portions 63B may be attached to the other end of the first frame 61 in the first direction. The guided portions 63B extend in the first direction. When the cover 3 opens or closes, the guided portions 63B may be guided by the guide 111Y (see FIG. 11) in the main-body side plate 11B.

As shown in FIG. 10, the guide 111Y extends in the third direction. The guide 111Y may be, for example, a groove. When the cover 3 moves between the cover-closed position and the cover-open position, the guided portions 63A may fit in the guide 111Y Optionally, the guide 111Y may be, for another example, a rib.

As shown in FIG. 11, in the state where the process cartridge 5Y is mounted in the main-body housing 2, the guide 111Y is located between the lever 517 and the outlet shutter 516Y in the second direction. Therefore, in the state where the process cartridge 5Y is mounted in the main-body housing 2, in a view along the first direction (see FIG. 11), the lever 517Y is located on a side of the guide 111Y opposite to the outlet shutter 516Y. In other words, the lever 517Y is located on one side of the guide 111Y in the second direction, and the outlet shutter 516Y is located on the other side of the guide 111Y in the second direction. Accordingly, in the state where the process cartridge 5Y is mounted in the main-body housing 2, with the cover 3 closing the opening 21, the lever 517Y is located on a side of the LED head 6Y opposite to the outlet shutter 516Y.

The guides 111Y, 111M, 111C, 111K align in the second direction. The guides 111M, 111C, 111K are in the same structure as the guide 111Y; therefore, description of the guides 111M, 111C, 111K is herein omitted.

3.1.2 Drum Guides 112Y, 112M, 112C, 112K

As shown in FIG. 10, in the state where the process cartridge 5Y is mounted in the main-body housing 2, the drum guide 112Y may guide the one end of the photosensitive drum 511Y. The drum guide 112Y may be, for example, a groove. In the state where the process cartridge 5Y is mounted in the main-body housing 2, the one end of the photosensitive drum 511Y fits with the drum guide 112Y. Optionally, for another example, the drum guide 112Y may be a rib. The drum guide 112Y has a first guiding portion 1121 and a second guiding portion 1122.

The first guiding portion 1121 is located on a side of the guide 111Y opposite to the inlet shutter 14Y in the second direction. The first guiding portion 1121 extends in the third direction along the guide 111Y.

The second guiding portion 1122 extends from one end of the first guiding portion 1121 on one side in the third direction toward the inlet shutter 14Y. The second guiding portion 1122 inclines with respect to the third direction. A tip of the second guiding portion 1122 is located on one side of the guide 111Y in the third direction. The tip of the second guiding portion 1122 is located between the guide 111Y and the waste toner tube 12 in the third direction.

The drum guides 112Y, 112M, 112C, 112K align in the second direction. The drum guides 112M, 112C, 112K are in the same structure as the drum guide 112Y; therefore, description of the drum guides 112M, 112C, 112K is herein omitted.

3.2 Waste Toner Tube 12

As shown in FIG. 9, the waste toner tube 12 is located between the main-body side plate 11A and the main-body side plate 11B in the first direction. The waste toner tube 12 is located between the main-body side plate 11A and the transfer device 7 in the first direction. As shown in FIG. 10, the waste toner tube 12 extends in the second direction. As shown in FIG. 11, in the state where the process cartridges 5Y, 5M, 5C, 5K are mounted in the main-body housing 2, the waste toner tube 12 is connected with the outlets 515Y, 515M, 515C, 515K. The waste toner tube 12 may receive the waste toners discharged from the outlets 515Y, 515M, 515C, 515K.

In particular, the waste toner tube 12 has a plurality of inlet openings 121Y, 121M, 121C, 121K and a waste toner outlet opening 122.

The inlet openings 121Y, 121M, 121C, 121K align in the second direction. In the state where the process cartridge 5Y is mounted in the main-body housing 2, the waste toner discharged from the outlet opening 5151Y may be received by the waste toner tube 12 through the inlet opening 121Y. In the state where the process cartridge 5M is mounted in the main-body housing 2, the waste toner discharged from the outlet opening 5151M may be received by the waste toner tube 12 through the inlet opening 121M. In the state where the process cartridge 5C is mounted in the main-body housing 2, the waste toner discharged from the outlet opening 5151C may be received by the waste toner tube 12 through the inlet opening 121C. In the state where the process cartridge 5K is mounted in the main-body housing 2, the waste toner discharged from the outlet opening 5151K may be received by the waste toner tube 12 through the inlet opening 121K.

Through the waste toner outlet opening 122, the waste toners in the waste toner tube 12 may be discharged. The waste toner outlet opening 122 is located at an end of the waste toner tube 12 on one side in the second direction.

3.2 Conveying Member 13

The conveying member 13 is located inside the waste toner tube 12. The conveying member 13 may convey the waste toners in the waste toner tube 12 in the second direction. The conveying member 13 may convey the waste toners in the waste toner tube 12 toward the waste toner outlet opening 122. The conveying member 13 may be, for example, an auger screw. The conveying member 13 extends in the second direction.

3.3 Inlet Shutters 14Y, 14M, 14C, 14K

As shown in FIGS. 10 and 11, the inlet shutter 14Y may open or close the inlet opening 121Y. In particular, the inlet shutter 14Y is movable between an inlet-shutter closed position (see FIG. 10) and an inlet-shutter open position (see FIG. 11). The inlet shutter 14Y is rotatable between the inlet-shutter closed position and the inlet-shutter open position. As shown in FIG. 10, in the state where the inlet shutter 14Y is located at the inlet-shutter closed position, the inlet shutter 14Y closes the inlet opening 121Y. As shown in FIG. 11, in the state where the inlet shutter 14Y is located at the inlet-shutter open position, the inlet shutter 14Y opens the inlet opening 121Y.

As shown in FIG. 10, the inlet shutter 14Y has a shutter body 141 and a side plate 142.

The shutter body 141 has a curved form. In the state where the process cartridge 5Y is mounted in the main-body housing 2, the shutter body 141 extends along a circumferential surface of the outlet shutter 516Y (see FIG. 11). In the meantime, the shutter body 141 extends in the first direction.

The side plate 142 is located at one end of the inlet shutter 14Y on the one side in the first direction. The side plate 142 extends in the second direction and in the third direction. The side plate 142 has a form of a disc. The side plate 142 has an engageable portion 143. In other words, the inlet shutter 14Y has an engageable portion 143.

The engageable portion 143 extends in a radial direction of the side plate 142. The engageable portion 143 may be, for example, a groove. Optionally, for another example, the engageable portion 143 may be a rib. In the state where the process cartridge 5Y is mounted in the main-body housing 2, the engaging portion 5163 (see FIG. 3) in the process cartridge 5Y engages with the engageable portion 143. In the state where the process cartridge 5Y is mounted in the main-body housing 2, the engaging portion 5163 in the process cartridge 5Y fits in the engageable portion 143. In the state where the engaging portion 5163 engages with the engageable portion 143, the inlet shutter 14Y is movable along with the outlet shutter 516Y.

In the state where the inlet shutter 14Y is located at the inlet-shutter closed position, the engageable portion 143 extends in the same direction as the second guiding portion 1122 of the drum guide 112Y. In other words, in the state where the process cartridge 5Y is mounted in the main-body housing 2, with the lever 517Y being located at the first position, with the outlet shutter 516Y closing the outlet opening 5151Y, and with the inlet shutter 14Y closing the inlet opening 121Y, the engaging portion 5163 and the engageable portion 143 extend in a mountable/demountable direction of the process cartridge 5Y, in which the process cartridge 5Y may be mounted in and demounted from the main-body housing 2.

In this arrangement, in the state where the process cartridge 5Y is mounted in the main-body housing 2, with the lever 517Y being located at the first position, and with the outlet shutter 516Y closing the outlet opening 5151Y, when the process cartridge 5Y is being demounted from the main-body housing 2, the engaging portion 5163 is disengaged from the engageable portion 143. In other words, in the state where the process cartridge 5Y is mounted in the main-body housing 2, with the lever 517Y being located at the first position, the process cartridge 5Y is demountable from the main-body housing 2. More specifically, in the state where the process cartridge 5Y is mounted in the main-body housing 2, with the lever 517Y being located at the first position, with the outlet shutter 516Y closing the outlet opening 5151Y, and with the inlet shutter 14Y closing the inlet opening 121Y, the engaging portion 5163 is enabled to disengage from the engageable portion 143, and enabling the disengagement of the engaging portion 5163 from the engageable portion 143 enables the process cartridge 5Y to be demounted from the main-body housing 2.

On the other hand, from the state where the process cartridge 5Y is demounted from the main-body housing 2, with the inlet shutter 14Y closing the inlet opening 121Y, when the process cartridge 5Y with the lever 517Y located at the first position and with the outlet shutter 516Y closing the outlet opening 5151Y is being mounted in the main-body housing 2, the engaging portion 5163 fits in the engageable portion 143.

Meanwhile, as shown in FIG. 11, in the state where the inlet shutter 14Y is located at the inlet-shutter open position, the engageable portion 143 extends in a direction different from the second guiding portion 1122 of the drum guide 112Y. In other words, in the state where the process cartridge 5Y is mounted in the main-body housing 2, with the lever 517Y being located at the second position, with the outlet shutter 516Y opening the outlet opening 5151Y, and with the inlet shutter 14Y opening the inlet opening 121Y, the engaging portion 5163 and the engageable portion 143 extend in a direction intersecting with the mountable/demountable direction of the process cartridge 5Y.

Therefore, in the state where the process cartridge 5Y is mounted in the main-body housing 2, with the lever 517 being located at the second position, and with the outlet shutter 516Y opening the outlet opening 5151Y, the engaging portion 5163 may not be disengaged from the engageable portion 143. Therefore, the process cartridge 5Y may not be demountable from the main-body housing 2. In other words, in the state where the process cartridge 5Y is mounted in the main-body housing 2, with the lever 517 being located at the second position, the engaging portion 5163 is disabled to be demounted from the engageable portion 143. More specifically, in the state where the process cartridge 5Y is mounted in the main-body housing 2, with the lever 517 being located at the second position, with the outlet shutter 516Y opening the outlet opening 5151Y, and with the inlet shutter 14Y opening the inlet opening 121Y, the engaging portion 5163 is disabled to disengage from the engageable portion 143, and disabling the disengagement of the engaging portion 5163 from the engageable portion 143 disables the process cartridge 5Y to be demounted from the main-body housing 2.

The inlet shutters 14M, 14C, 14K are in the same structure as the inlet shutter 14Y; therefore, description of the inlet shutters 14M, 14C, 14K is herein omitted.

3.4 Stoppers 15Y, 15M, 15C, 15K

The stoppers 15Y, 15M, 15C, 15K are located on an inner surface of the cover 3. In the state where the cover 3 is located at the cover-closed position, the stoppers 15Y, 15M, 15C, 15K align in the second direction. In the state where the cover 3 is located at the cover-closed position, the stoppers 15Y, 15M, 15C, 15K protrude in the third direction from the inner surface of the cover 3.

In the state where the process cartridge 5Y is mounted in the main-body housing 2, when the lever 517 is located at the second position, and when the cover 3 is located at the cover-closed position, the stopper 15Y may restrict the lever 517Y from moving from the second position to the first position. In the state where the process cartridge 5Y is mounted in the main-body housing 2, with the lever 517 being located at the second position, and with the cover 3 being located at the cover-closed position, the stopper 15Y faces the grip 5173 in a movable direction of the grip 5173, which may move when the lever 517Y moves from the second position to the first position.

Meanwhile, in the state where the process cartridge 5Y is mounted in the main-body housing 2, when the lever 517 is located at the first position, the stopper 15Y collides with the lever 517, and thereby the cover 3 is restricted from closing.

The stoppers 15M, 15C, 15K are in the same structure as the stopper 15Y; therefore, description of the stoppers 15M, 15C, 15K is herein omitted.

4. MOUNTING AND DEMOUNTING PROCESS CARTRIDGE 5Y

Next, with reference to FIGS. 11 and 12, how the process cartridge 5Y may be mounted in and demounted from the main-body housing 2 will be described below.

As shown in FIG. 11, in the state where the process cartridge 5Y is mounted in the main-body housing 2, with the cover 3 closing the opening 21, the lever 517Y of the process cartridge 5Y is located at the second position. In this arrangement, the outlet shutter 516Y is located at the outlet-shutter open position, and the inlet shutter 14Y is located at the inlet-shutter open position.

In order to demount the process cartridge 5Y from the main-body housing 2, a user may, first, move the cover 3 from the cover-closed position (see FIG. 11) to the cover-open position (see FIG. 2). Accordingly, the stopper 15Y may separate from the lever 517Y, and the lever 517Y is allowed to move from the second position to the first position.

Next, the user may move the lever 517Y from the second position to the first position. Accordingly, the outlet shutter 516Y may move from the outlet-shutter open position to the outlet-shutter closed position, and the inlet shutter 14Y may move from the inlet-shutter open position to the inlet-shutter closed position.

Next, the user may remove the process cartridge 5Y from the main-body housing 2 along the drum guide 112Y. Accordingly, the engaging portion 5163 of the outlet shutter 516Y and the engageable portion 143 of the inlet shutter 14Y may be disengaged, and the process cartridge 5Y may be demounted from the main-body housing 2.

On the other hand, in order to mount the process cartridge 5Y in the main-body housing 2, while the cover 3 is open, the user may slot the process cartridge 5Y along the drum guide 112Y inside the main-body housing 2. Accordingly, the engaging portion 5163 of the outlet shutter 516Y may engage with the engageable portion 143 of the inlet shutter 14Y. Therefore, the inlet shutter 14Y is enabled to move along with the outlet shutter 516.

Next, the user may move the lever 517Y from the first position to the second position. Accordingly, the outlet shutter 516Y may move from the outlet-shutter closed position to the outlet-shutter open position, and the inlet shutter 14Y may move from the inlet-shutter closed position to the inlet-shutter open position.

Next, the user may move the cover 3 from the cover-open position (see FIG. 2) to the cover-closed position (see FIG. 11). Thus, the process cartridge 5Y may be mounted in the main-body housing 2.

5. BENEFITS (1) According to the image forming apparatus 1, as shown in FIG. 3, the process cartridge 5Y has the lever 517Y, through which the outlet shutter 516Y may be opened or closed.

Therefore, by moving the lever 517Y of the process cartridge 5Y that needs to be replaced among the plurality of process cartridges 5Y, 5M, 5C, 5K (see FIG. 11) mounted in the image forming apparatus 1, the outlet shutter 516Y of the process cartridge 5Y that may need to be replaced alone may be closed.

Therefore, when the process cartridge 5Y among the plurality of process cartridges 5Y, 5M, 5C, 5K mounted in the image forming apparatus 1 is to be replaced with a new process cartridge 5Y, the outlet shutters 516M, 516C, 516K of the process cartridges 5M, 5C, 5K that may not be replaced may not be opened or closed unnecessarily.

This reduces the likeliness that the areas around the outlet shutters 516M, 516C, 516K of the process cartridges 5M, 5C, 5K are dirtied with the toners.

(2) According to the image forming apparatus 1, as shown in FIG. 11, in the state where the process cartridge 5Y is mounted in the main-body housing 2, the engaging portion 5163 (see FIG. 3) of the outlet shutter 516Y may engage with the engageable portion 143 (see FIG. 10) of the inlet shutter 14Y. In the state where the engaging portion 5163 engages with the engageable portion 143, the inlet shutter 14Y is movable along with the outlet shutter 516.

Therefore, with a single action to move the lever 517Y from the second position to the first position, not only the outlet shutter 516Y but also the inlet shutter 14Y may be closed.

Accordingly, when the process cartridge 5Y is replaced with a new process cartridge 5Y, the inlet shutter 14Y may remain closed, and burden on the user for replacement may be reduced or may be less complicated.

(3) According to the image forming apparatus 1, as shown in FIG. 11, in the state where the process cartridge 5Y is mounted in the main-body housing 2, with the lever 517 being located at the second position, with the outlet opening 5151Y being open, and with the inlet opening 121Y being open, the engaging portion 5163 are restricted from being disengaged from the engageable portion 143. Thereby, the process cartridge 5Y may be disabled to be demounted from the main-body housing 2.

Accordingly, the process cartridge 5Y may be prevented from being removed from the main-body housing 2 while the outlet shutter 516Y is open.

(4) According to the image forming apparatus 1, as shown in FIG. 3, the transmission member 518Y is rotatable about the first axis A1.

Therefore, the transmission member 518Y may be placed in the space sideward from the photosensitive drum 511Y in the first direction efficiently.

6. MODIFIED EXAMPLE

Figure 12:
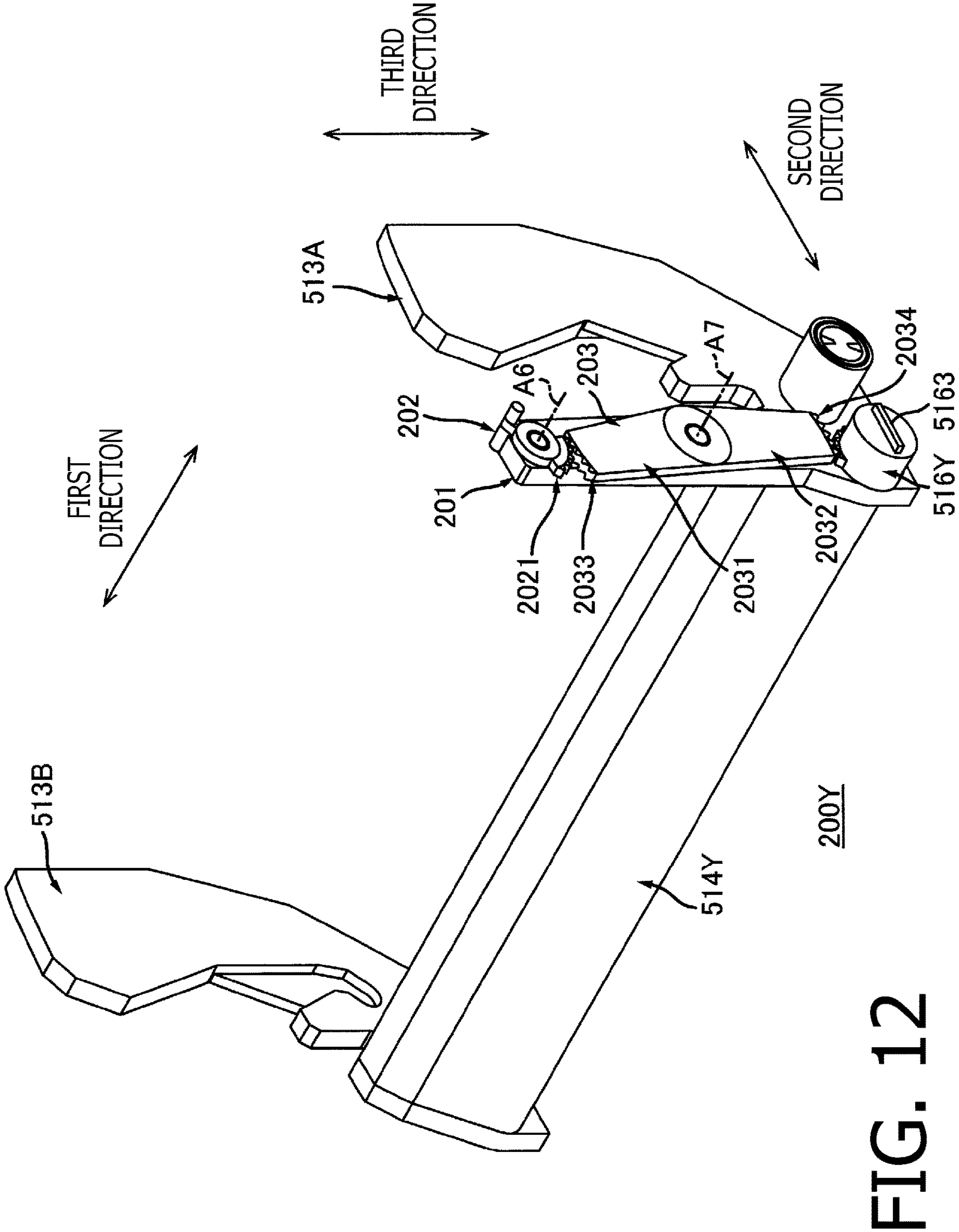
FIG. 12 is a perspective view of a modified drum cartridge.
Figure 13:
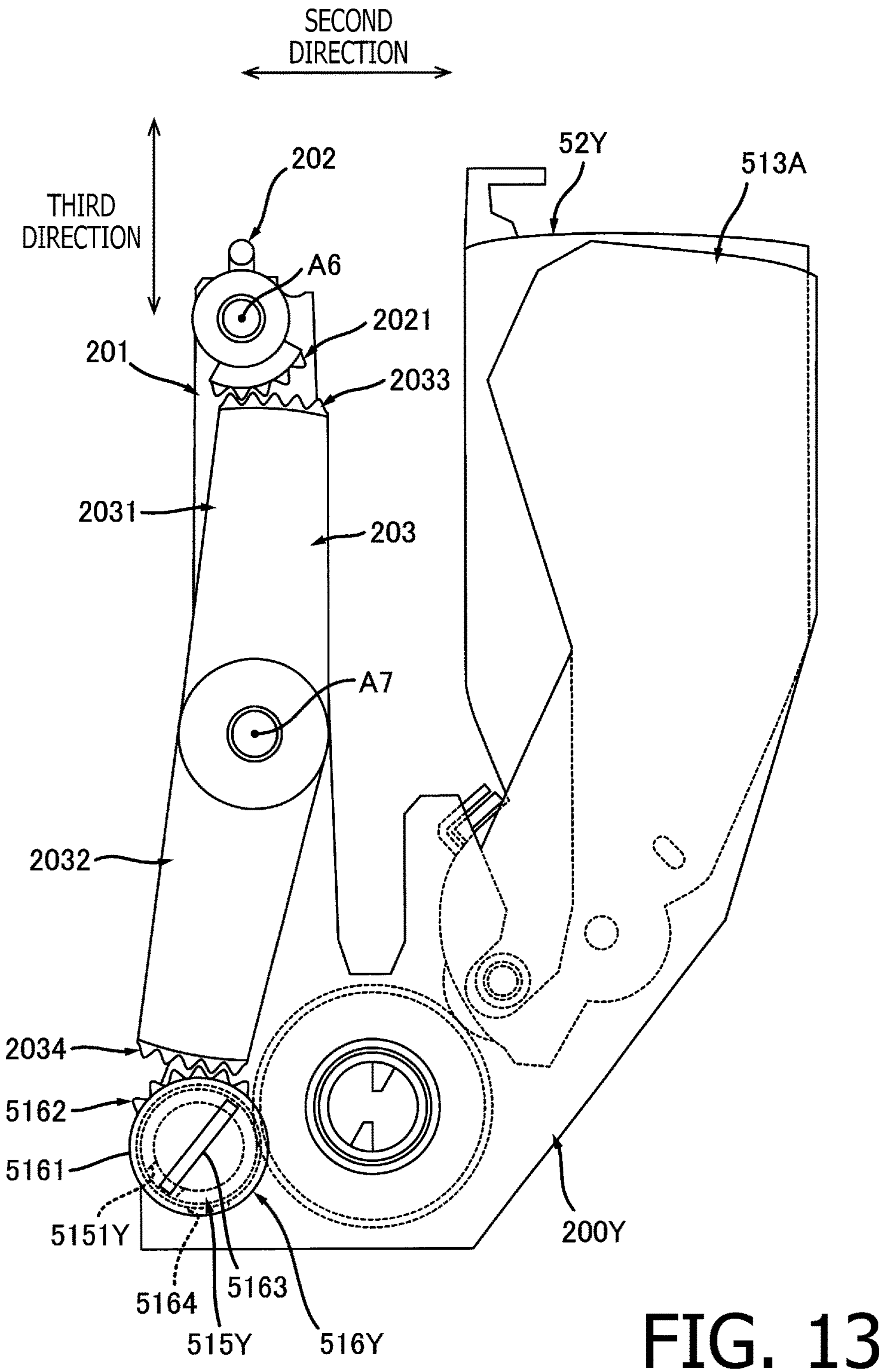
FIG. 13 is a sideward view of the modified drum cartridge with a lever located at a first position.
Figure 14:
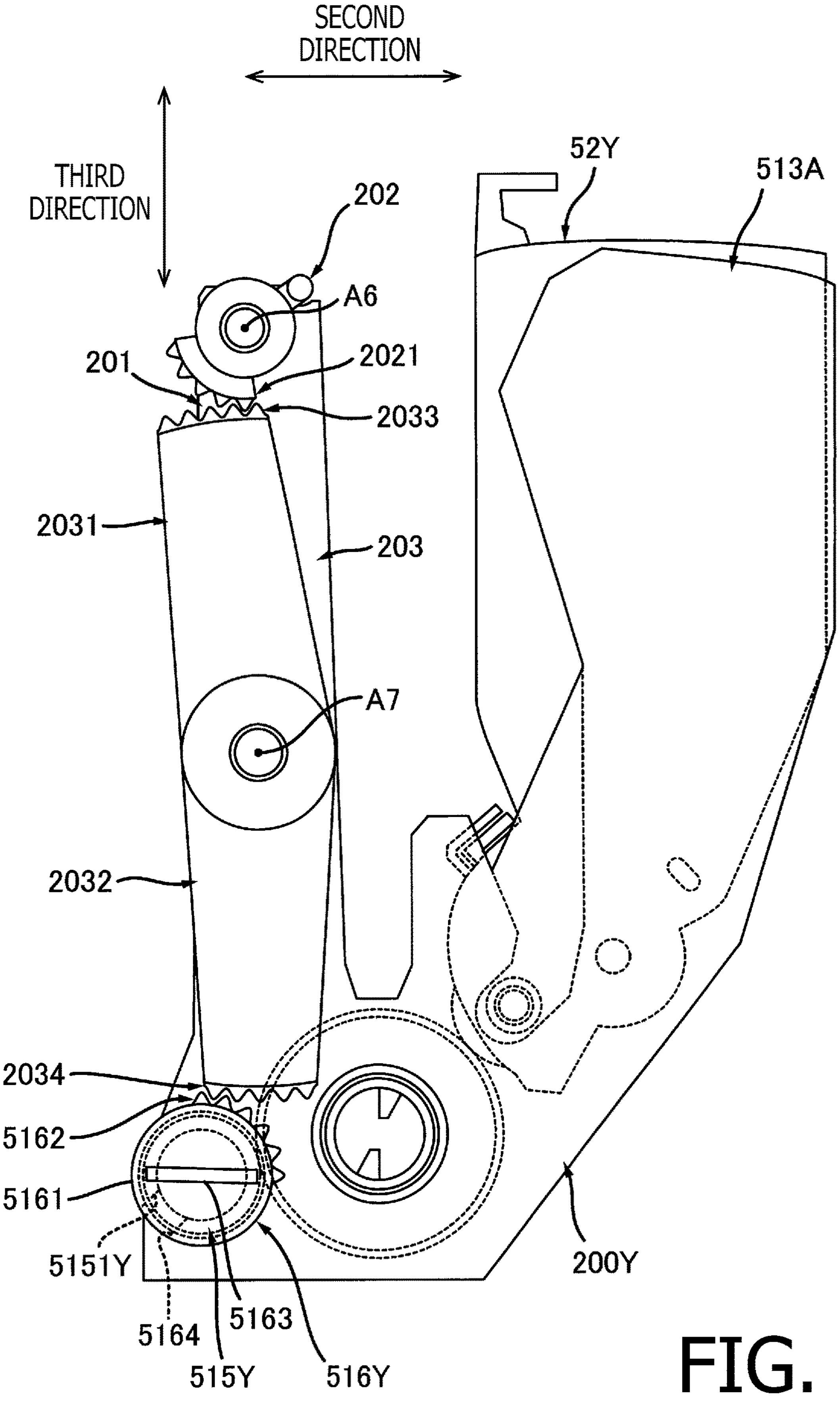
FIG. 14 is a sideward view of the modified drum cartridge with the lever located at a second position.

With reference to FIGS. 12-14, a modified example of the embodiment according to the present disclosure will be described. In the modified example, items that are substantially identical to those described above will be referred to by the same reference signs, and description of those items is herein omitted.

In the modified example, as shown in FIG. 12, the first side plate 513A has a supporting portion 201. A lever 202 and a transmission member 203 are supported by the supporting portion 201. In other words, the lever 202 is not supported by the second side plate 513B but is supported by the first side plate 513A alone. The supporting portion 201 is located on a side of the outlet shutter 516Y toward the other side in the third direction. The supporting portion 201 extends in the third direction.

6.1 Lever 202

The lever 202 is located on an end of the supporting portion 201 toward the other side in the third direction. The lever 202 is attached to the end of the supporting portion 201 toward the other side in the third direction. As shown in FIG. 13, in a state where the toner cartridge 52Y is attached to a drum cartridge 200Y, the lever 202 is located apart from the toner cartridge 52Y in the second direction. The lever 202 is located on one side of the first axis A1 opposite to the toner cartridge 52Y in the second direction.

In the modified example, in the state where the process cartridge 5Y is mounted in the main-body housing 2, with the cover 3 closing the opening 21, the LED head 6Y (see FIG. 11) is located between the lever 202 and the toner cartridge 52Y in the second direction. In other words, in the state where the process cartridge 5Y is mounted in the main-body housing 2, with the cover 3 closing the opening 21, the lever 202 is located on a side of the LED head 6Y opposite to the toner cartridge 52Y. Moreover, in the state where the process cartridge 5Y is mounted in the main-body housing 2, with the cover 3 closing the opening 21, in a view along the first direction, the lever 202 is located on a side of the guide 111Y (see FIG. 11) opposite to the toner cartridge 52Y. In other words, the lever 202 is located on one side of the guide 111Y in the second direction, and the toner cartridge 52Y is located on the other side of the guide 111Y in the second direction.

As shown in FIGS. 13 and 14, the lever 202 is rotatable about an axis A6 between a first position (see FIG. 13) and a second position (see FIG. 14). The axis A6 extends in the first direction. As shown in FIG. 13, in the state where the lever 202 is located at the first position, the outlet shutter 516Y is closed. As shown in FIG. 14, in the state where the lever 202 is located at the second position, the outlet shutter 516Y opens.

The lever 202 has gear teeth 2021. The gear teeth 2021 align along a rotatable direction of the lever 202.

6.2 Transmission Member 203

As shown in FIG. 13, the transmission member 203 is located between the lever 202 and the outlet shutter 516Y in the third direction. In the state where the process cartridge 5Y attached to the drum cartridge 200Y, the transmission member 203 is located apart from the toner cartridge 52Y in the second direction. In the state where the process cartridge 5Y is mounted in the main-body housing 2, with the cover 3 closing the opening 21, the LED head 6Y is located between the transmission member 203 and the toner cartridge 52Y in the second direction. In other words, in the state where the process cartridge 5Y is mounted in the main-body housing 2, with the cover 3 closing the opening 21, the transmission member 203 is located on a side of the LED head 6Y opposite to the toner cartridge 52Y. Moreover, in the state where the process cartridge 5Y is mounted in the main-body housing 2, with the cover 3 closing the opening 21, in a view along the first direction, the transmission member 203 is located on a side of the guide 111Y opposite to the toner cartridge 52Y.

The transmission member 203 extends in the third direction. The transmission member 203 is pivotable on an axis A7. The transmission member 203 may transmit power from the lever 202 to the receiver 5162 of the outlet shutter 516Y. The transmission member 203 has a first arm 2031 and a second arm 2032.

The first arm 2031 is located between the axis A7 and the lever 202 in the third direction. The first arm 2031 extends in the third direction. The first arm 2031 has gear teeth 2033. The gear teeth 2033 are located at a tip of the first arm 2031. The gear teeth 2033 align along a movable direction of the first arm 2031, which may move when the transmission member 203 pivots. The gear teeth 2033 mesh with the gear teeth 2021 of the lever 202.

The second arm 2032 is located between the axis A7 and the outlet shutter 516Y in the third direction. The second arm 2032 extends in the third direction. The second arm 2032 has gear teeth 2034. The gear teeth 2034 are located at a tip of the second arm 2032. The gear teeth 2034 align along a movable direction of the second arm 2032, which may move when the transmission member 203 pivots. The gear teeth 2034 mesh with the receiver 5162 of the outlet shutter 516Y.

According to the configuration of the modified example, the benefits achievable from the embodiment described previously may be similarly achieved.

While the invention has been described in conjunction with example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

For example, the image forming apparatus may not necessarily be configured to operate with the plurality of process cartridges 5Y, 5M, 5C, 5K but may be operable with a single process cartridge alone, e.g., the process cartridge 5K, having the drum cartridge 51K with the photosensitive drum 511K, the drum cleaner, the outlet 515K, the outlet shutter 516K as described above and the toner cartridge attachable to the drum cartridge 51K as described above.

What is claimed is:

1. An image forming apparatus, comprising:

a main-body housing having an opening; and a process cartridge demountably mountable in the main-body housing through the opening, the process cartridge including:

a drum cartridge including:

a photosensitive drum;

a drum cleaner configured to clean a circumferential surface of the photosensitive drum;

an outlet having an outlet opening, waste toner in the drum cleaner being dischargeable through the outlet opening; and an outlet shutter configured to open and close the outlet opening; and a toner cartridge configured to store toner to be supplied to the photosensitive drum, the toner cartridge being detachably attachable to the drum cartridge, wherein the drum cartridge further includes a lever configured to move the outlet shutter, the lever being pivotable between a first position at which the lever places the outlet shutter closing the outlet opening and a second position at which the lever places the outlet shutter opening the outlet opening, wherein, in a state where the process cartridge is mounted in the main-body housing, when the lever is located at the first position, the process cartridge is demountable from the main-body housing, and wherein, in the state where the process cartridge is mounted in the main-body housing, when the lever is located at the second position, the process cartridge is disabled to be demounted from the main-body housing.

2. The image forming apparatus according to claim 1, further comprising:

a waste toner tube having an inlet opening, the waste toner tube being, in the state where the process cartridge is mounted in the main-body housing, connected with the outlet and receive the waste toner, discharged through the outlet opening, through the inlet opening; and an inlet shutter configured to open and close the inlet opening, wherein the outlet shutter includes an engaging portion, wherein the inlet shutter includes an engageable portion configured to be engaged with the engaging portion in the state where the process cartridge is mounted in the main-body housing, and wherein, in a state where the engageable portion is engaged with the engaging portion, the inlet shutter is movable along with the outlet shutter.

3. The image forming apparatus according to claim 2, wherein in the state where the process cartridge is mounted in the main-body housing, when the lever is located at the first position, the outlet shutter closes the outlet opening, the inlet shutter closes the inlet opening, and the engaging portion and the engageable portion are located such that the process cartridge is allowed to be demounted from the main-body housing, and in the state where the process cartridge is mounted in the main-body housing, when the lever is located at the second position, the outlet shutter opens the outlet opening, the inlet shutter opens the inlet opening, and the engaging portion and the engageable portion are located such that the process cartridge is not allowed to be demounted from the main-body housing.

4. The image forming apparatus according to claim 3, wherein the engaging portion is a rib, the engageable portion is a groove, in the state where the process cartridge is mounted in the main-body housing, when the lever is located at the first position, the outlet shutter closes the outlet opening, the inlet shutter closes the inlet opening, and the engaging portion and the engageable portion extend in a mountable/demountable direction of the process cartridge, in which the process cartridge is mountable in and demountable from the main-body housing, and in the state where the process cartridge is mounted in the main-body housing, when the lever is located at the second position, the outlet shutter opens the outlet opening, the inlet shutter opens the inlet opening, and the engaging portion and the engageable portion extend in a direction intersecting with the mountable/demountable direction of the process cartridge.

5. The image forming apparatus according to claim 1, wherein the outlet shutter includes a receiver configured to receive power from the lever.

6. The image forming apparatus according to claim 5, wherein the drum cartridge further includes a transmission member located between the lever and the outlet shutter, the transmission member being configured to transmit the power from the lever to the receiver.

7. The image forming apparatus according to claim 6, wherein the lever has gear teeth, the receiver has gear teeth located apart from the gear teeth in the lever, the transmission member is an idle gear meshing with the gear teeth in the lever and the gear teeth in the receiver.

8. The image forming apparatus according to claim 7, wherein the photosensitive drum is rotatable about an axis extending in a predetermined direction, and the transmission member is rotatable about the axis.

9. The image forming apparatus according to claim 1, wherein the photosensitive drum is rotatable about an axis extending in a predetermined direction, the drum cartridge further includes:

a first side plate supporting a first end of the photosensitive drum on one side in the predetermined direction; and a second side plate supporting a second end of the photosensitive drum opposite to the first end in the predetermined direction.

10. The image forming apparatus according to claim 9, wherein the lever has:

a first arm supported by the first side plate;

a second arm supported by the second side plate; and a grip located between the first arm and the second arm, the grip extending in the predetermined direction, the grip being connected to the first arm at a first end of the grip in the predetermined direction and to the second arm at a second end of the grip opposite to the first end in the predetermined direction.

11. The image forming apparatus according to claim 9, wherein the lever is supported by the first side plate.

12. The image forming apparatus according to claim 9, further comprising:

a cover configured to open and close the opening;

an LED head supported by the cover, the LED head being configured to, in the state where the process cartridge is mounted in the main-body housing, when the cover closes the opening, emit exposure light at the circumferential surface of the photosensitive drum; and a guide located apart from the first side plate of the drum cartridge in the predetermined direction in the state where the process cartridge is mounted in the main-body housing, the guide being configured to guide the LED head, wherein the LED head includes an engageable portion located at a first end of the LED head on the one side in the predetermined direction, the engageable portion being configured to be guided by the guide when the cover opens and closes the opening, and wherein, in the state where the process cartridge is mounted in the main-body housing, at least a part of the lever is located between the first side plate and the guide in the predetermined direction.

13. The image forming apparatus according to claim 12, wherein, in the state where the process cartridge is mounted in the main-body housing, in a view along the predetermined direction, the lever is located on a side of the guide opposite to the outlet shutter.

14. The image forming apparatus according to claim 12, wherein, in the state where the process cartridge is mounted in the main-body housing, in a view along the predetermined direction, the lever is located on a side of the guide opposite to the toner cartridge.

15. The image forming apparatus according to claim 1, wherein in a state where the process cartridge is demounted from the main-body housing, when the toner cartridge is attached to the drum cartridge, the toner cartridge is movable between a cartridge-first position at which the toner cartridge is undetachable from the drum cartridge and a cartridge-second position at which the toner cartridge is detachable from the drum cartridge, and the drum cartridge includes a locking member, the locking member movable between a locking position at which the locking member locks the toner cartridge at the cartridge-first position and an unlocking position at which the locking member unlocks the toner cartridge from the cartridge-first position.

16. The image forming apparatus according to claim 1, a cover configured to open and close the opening; and an LED head supported by the cover, the LED head being configured to, in the state where the process cartridge is mounted in the main-body housing, when the cover closes the opening, emit exposure light at the circumferential surface of the photosensitive drum;

wherein, in the state where the process cartridge is mounted in the main-body housing, when the cover closes the opening, the toner cartridge is located on a side of the LED head opposite to the outlet shutter in a view along a predetermined direction.

17. The image forming apparatus according to claim 16, wherein, in the state where the process cartridge is mounted in the main-body housing, when the cover closes the opening, the lever is located on the side of the LED head opposite to the outlet shutter in a view along the predetermined direction.

18. The image forming apparatus according to claim 16, wherein, in the state where the process cartridge is mounted in the main-body housing, when the cover closes the opening, the lever is located on a side of the LED head opposite to the toner cartridge in a view along the predetermined direction.

19. The image forming apparatus according to claim 1, wherein the process cartridge is a first process cartridge, the first process cartridge including:

a first drum cartridge being the drum cartridge, the first drum cartridge including:

a first photosensitive drum being the photosensitive drum;

a first drum cleaner being the drum cleaner;

a first outlet being the outlet, the first outlet having a first outlet opening being the outlet opening; and a first outlet shutter being the outlet shutter; and a first toner cartridge being the toner cartridge, the image forming apparatus further comprises a second process cartridge demountably mountable in the main-body housing through the opening, the second process cartridge aligns with the first process cartridge in a state where the first process cartridge and the second process cartridge are mounted in the main-body housing, the second process cartridge including:

a second drum cartridge including:

a second photosensitive drum;

a second drum cleaner configured to clean a circumferential surface of the second photosensitive drum;

a second outlet having a second outlet opening, waste toner in the second drum cleaner being dischargeable through the second outlet opening; and a second outlet shutter configured to open and close the second outlet opening; and a second toner cartridge configured to store toner to be supplied to the second photosensitive drum, the second toner cartridge being detachably attachable to the second drum cartridge, and a waste toner tube configured to, in a state where the first process cartridge and the second process cartridge are mounted in the main-body housing, be connected with the first outlet and the second outlet and receive the waste toner discharged through the first outlet opening and the waste toner discharged through the second outlet opening.

20. The image forming apparatus according to claim 1, wherein, in a state where the process cartridge is demounted from the main-body housing, the toner cartridge is detachably attachable to the drum cartridge.

21. An image forming apparatus, comprising:

a main-body housing having an opening; and a plurality of process cartridges, each of the plurality of process cartridges being demountably mountable in the main-body housing through the opening, each of the plurality of process cartridges including:

a drum cartridge including:

a photosensitive drum;

a drum cleaner configured to clean a circumferential surface of the photosensitive drum;

an outlet having an outlet opening, waste toner in the drum cleaner being dischargeable through the outlet opening; and an outlet shutter configured to open and close the outlet opening; and a toner cartridge configured to store toner to be supplied to the photosensitive drum, the toner cartridge being detachably attachable to the drum cartridge, wherein the drum cartridge further includes a lever configured to move the outlet shutter, the lever being pivotable between a first position at which the lever places the outlet shutter closing the outlet opening and a second position at which the lever places the outlet shutter opening the outlet opening, wherein, in a state where one of the plurality of process cartridges is mounted in the main-body housing, when the lever is located at the first position, the one of the plurality of process cartridges is demountable from the main-body housing, and wherein, in the state where the one of the plurality of process cartridges is mounted in the main-body housing, when the lever is located at the second position, the one of the plurality of process cartridges is disabled to be demounted from the main-body housing.

* * * * *